(12) United States Patent
Dormody et al.

(10) Patent No.: US 12,228,402 B2
(45) Date of Patent: Feb. 18, 2025

(54) SYSTEMS AND METHODS FOR CALIBRATING UNSTABLE SENSORS

(71) Applicant: NextNav, LLC, Sunnyvale, CA (US)

(72) Inventors: Michael Dormody, San Jose, CA (US); Ganesh Pattabiraman, Saratoga, CA (US); Abijith Kumar, San Jose, CA (US); Thomas Wolf, Mountain View, CA (US); Gary Parsons, Mclean, VA (US); Christian Gates, Vienna, VA (US); Deepak Joseph, Fairfax, VA (US); Badrinath Nagarajan, South San Francisco, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 18/539,991

(22) Filed: Dec. 14, 2023

(65) Prior Publication Data
US 2024/0118081 A1    Apr. 11, 2024

Related U.S. Application Data

(63) Continuation of application No. 17/644,029, filed on Dec. 13, 2021, now Pat. No. 11,892,295, which is a
(Continued)

(51) Int. Cl.
*G01C 17/38* (2006.01)
*G01C 5/06* (2006.01)
(Continued)

(52) U.S. Cl.
CPC ............... *G01C 17/38* (2013.01); *G01C 5/06* (2013.01); *G01C 21/10* (2013.01); *G01C 21/165* (2013.01);
(Continued)

(58) Field of Classification Search
CPC .... H04B 7/0697; H04W 4/024; H04W 4/029; H04W 4/33; H04W 64/00; H04W 64/003;
(Continued)

(56) References Cited

U.S. PATENT DOCUMENTS

| 5,646,857 A | 7/1997 | McBurney et al. |
| 5,652,592 A | 7/1997 | Sanderford et al. |

(Continued)

FOREIGN PATENT DOCUMENTS

| CN | 101995236 A | 3/2011 |
| CN | 102075936 A | 5/2011 |

(Continued)

OTHER PUBLICATIONS

Notice of Allowance and Fees dated Mar. 13, 2024 for U.S. Appl. No. 18/363,329.
(Continued)

*Primary Examiner* — Anthony R Jimenez
(74) *Attorney, Agent, or Firm* — MLO, a professional corp.

(57) ABSTRACT

Calibrating an unstable sensor of a mobile device. Systems and methods for calibrating a sensor of a mobile device determine a first estimated position of the mobile device without using any measurement from the sensor of the mobile device, generate a second estimated position of the mobile device using a measurement from the sensor, estimate a sensor error of the sensor using the first estimated position and the second estimated position, and use the sensor error to determine a calibration value for adjusting one or more measurements from the sensor.

14 Claims, 11 Drawing Sheets

Related U.S. Application Data continuation of application No. 16/684,859, filed on Nov. 15, 2019, now Pat. No. 11,199,406, which is a continuation of application No. 15/692,142, filed on Aug. 31, 2017, now Pat. No. 10,514,258.

(60) Provisional application No. 62/489,926, filed on Apr. 25, 2017, provisional application No. 62/385,911, filed on Sep. 9, 2016.

(51) Int. Cl.

| | | |
|---|---|---|
| *G01C 21/10* | (2006.01) | |
| *G01C 21/16* | (2006.01) | |
| *G01C 25/00* | (2006.01) | |
| *G01S 5/00* | (2006.01) | |
| *G01S 5/02* | (2010.01) | |
| *G01S 19/14* | (2010.01) | |
| *G01S 19/40* | (2010.01) | |

(52) U.S. Cl.
CPC ........... *G01C 25/00* (2013.01); *G01C 25/005* (2013.01); *G01S 19/14* (2013.01); *G01S 5/012* (2020.05); *G01S 5/017* (2020.05); *G01S 5/02* (2013.01); *G01S 19/40* (2013.01)

(58) Field of Classification Search
CPC ........... H04W 64/006; H04W 52/0209; H04W 52/0251; H04W 52/0254; G01D 18/008; G01C 17/38; G01C 5/06; G01C 5/00; G01C 21/16; G01C 21/10; G01C 21/165; G01C 11/00; G01C 11/06; G01C 25/00; G01C 25/005; G01C 25/02; G01C 2205/00; G01C 2205/001; G01C 2205/008; G01C 17/46; G01C 17/50; G01C 5/0009; G01C 5/005; G01C 5/0257; G01C 5/0263; G01C 5/0269; G01C 5/0027; G01C 5/36; G01C 5/0045; G01C 5/0063; G01C 5/01; G06T 7/00; G06T 7/337; G06T 7/74; G06T 2207/30244; G06T 2207/30252; Y10S 903/93; B60W 2550/22; B60W 2550/408; B60W 2710/18; B60W 2710/305; B60W 20/12; B60W 20/11; B60W 20/40; B60W 10/06; B60W 10/08; B60L 2240/62; B60L 7/18; G05D 1/00; G05D 1/02; G05D 1/04; G05D 1/06; G01S 19/14; G01S 19/40; G01S 13/00; G01S 13/882; G01S 2013/08
USPC .................................................... 701/22, 408
See application file for complete search history.

(56) References Cited

U.S. PATENT DOCUMENTS

| | | |
|---|---|---|
| 6,522,298 B1 | 2/2003 | Burgett et al. |
| 6,678,630 B1 | 1/2004 | Joder et al. |
| 6,970,795 B1 | 11/2005 | Burgett et al. |
| 7,428,466 B2 | 9/2008 | Makela et al. |
| 7,429,948 B2 | 9/2008 | Burgett et al. |
| 7,991,405 B2 | 8/2011 | Zhao |
| 8,174,931 B2 | 5/2012 | Vartanian et al. |
| 8,188,912 B1 | 5/2012 | Weisenburger |
| 8,412,158 B2 | 4/2013 | Forutanpour et al. |
| 8,566,032 B2 | 10/2013 | Chowdhary et al. |
| 8,706,131 B2 | 4/2014 | Winters |
| 9,980,246 B2* | 5/2018 | Pattabiraman ........ H04W 4/021 |
| 10,514,258 B2 | 12/2019 | Dormody et al. |
| 11,199,406 B2 | 12/2021 | Dormody et al. |
| 2001/0047230 A1 | 11/2001 | Gremmert et al. |
| 2007/0218823 A1 | 9/2007 | Wolf |
| 2007/0239326 A1 | 10/2007 | Johnson et al. |
| 2008/0046214 A1 | 2/2008 | Fowler |
| 2010/0212421 A1 | 8/2010 | Young et al. |
| 2012/0072110 A1 | 3/2012 | Venkatraman |
| 2012/0087212 A1 | 4/2012 | Vartanian et al. |
| 2012/0265373 A1 | 10/2012 | Ingvalson et al. |
| 2015/0127287 A1 | 5/2015 | Wolf et al. |
| 2015/0330780 A1 | 11/2015 | Yuzawa et al. |
| 2016/0003949 A1 | 1/2016 | Venkataraman et al. |
| 2016/0047648 A1 | 2/2016 | Edge et al. |
| 2017/0363423 A1* | 12/2017 | Dormody ............... G01C 17/38 |

FOREIGN PATENT DOCUMENTS

| | | |
|---|---|---|
| CN | 103189717 A | 7/2013 |
| CN | 103414825 A | 11/2013 |
| CN | 103718058 A | 4/2014 |
| CN | 104748722 A | 7/2015 |
| CN | 105684260 A | 6/2016 |
| CN | 105745522 A | 7/2016 |
| CN | 105874302 A | 8/2016 |
| JP | H01307614 A | 12/1989 |
| WO | 2015063340 A1 | 5/2015 |
| WO | 2016102142 A1 | 6/2016 |

OTHER PUBLICATIONS

Angelo Sabatini et al: "A Stochastic Approach to Noise Modeling for Barometric Altimeters", SENSORS, vol. 13, No. 11, Nov. 18, 2013 (Nov. 18, 2013), pp. 15692-15707. XP055419074, DOI: 10.3390/s131115692 equation 5: p. 15695; table 1.

Anonymous, Wi-Fi positioning system—Wikipedia, Nov. 7, 2014, URL:https://en.wikipedia.org/w/index.php?title=W1%ADFi_position.

European Search Report dated Nov. 17, 2022 for European Patent Office Patent Application No. 22168943.3.

Form PCT/ISA/206, PCT/US2017/049570, "Invitation to pay additional fees and, where applicable, protest fee", 9 page(s);EPO Form P04A42, PCT/ US2017/049570, "Information on Search Strategy", 1 page(s); EPO FORM 17 1704.17, PCT/ US2017/049570, "Information on Search Strategy", 1 page(s); EPO FORM 1707 04.17, PCT/ US2017/049570, "Information on search strategy", 8 page(s); Date of Mailing Nov. 16, 2017.

Form PCT/ISA/220, PCT/US2017/049570, "Notification of Transmittal of the International Search Report and the Written Opinion of the International Searching Authority, or the Declaration", 1 page(s); Form PCT/ISA/210, PCT/US2017/049570, "International Search Report", 6 page(s); EPO FORM P04A42, PCT/US2017/049570, "Information on Search Strategy", 1 page(s); Form PCT/ISA/237, PCT/US2017/049570, "Written Opinion of the International Searching Authority", 13 page(s). Date of Mailing Jan. 9, 2018.

Liu Wei et al., A MINS Optical Detector Integrated Navigation System, Geomatics and Information Science of Wuhan University, No. 12, 1392-1395 pgs, Dec. 5, 2010.

Notice of Allowance and Fees dated Aug. 13, 2021 for U.S. Appl. No. 16/684,859.

Notice of Allowance and Fees dated May 8, 2023 for U.S. Appl. No. 17/647,826.

Notice of Allowance and Fees dated Sep. 27, 2023 for U.S. Appl. No. 17/644,029.

Office Action dated Dec. 22, 2021 for European Patent Office Patent Application No. 17767957.8.

Office Action dated Dec. 25, 2020 for Chinese Patent application No. 201780051088.1.

Office Action dated Feb. 9, 2021 for U.S. Appl. No. 16/684,859.

Office Action dated Jun. 9, 2021 for China Patent Application No. 201780051088.1.

Office Action dated Mar. 20, 2023 for U.S. Appl. No. 17/644,029.

Office Action dated Nov. 10, 2022 for U.S. Appl. No. 17/647,826.

Office Action dated Nov. 26, 2021 for Republic of Korea Patent Application No. 10-2019-7007704.

Office Action dated Nov. 9, 2020 for European Patent application No. 17767957.8.

(56) References Cited

OTHER PUBLICATIONS

Office Action dated Oct. 28, 2020 for U.S. Appl. No. 16/684,859.
Office Action dated Oct. 5, 2022 for U.S. Appl. No. 17/644,029.
Office Action dated Sep. 17, 2021 for China Patent Application No. 201780051088.1.
Shu-Lan Xia et al., A Temperature Compensation Algorithm Based onCurve Fitting and Spline Interpolation, Chemical Engineering Transactions, Jul. 31, 2016, pp. 1345-1350, URL:https://www.aidic.it/cet/16/51 /225.pdf.
Siltanen, Sanni et al., Interactive Outdoor Mobile Augmentation using Markerless Tracking and GPS, 1-5 pgs, ResearchGate, Oct. 21, 2015.
Werner, et al., Indoor positioning using smartphone camera, Sep. 21, 2011, International Conference, pp. 1-6, Munich, Germany.
Xia, Shu-Lan, et al., "A Temperature Compensation Algorithm Based on Curve Fitting and Spline Interpolation", Chemical Engineering Transactions, Jul. 31, 2016, 6 pages, Retrieved from the Internet: URL: https://www.aidic.it/cet/16/51/225.pdf, retrieved on Oct. 22, 2020].

\* cited by examiner

SYSTEMS AND METHODS FOR CALIBRATING UNSTABLE SENSORS

CROSS-REFERENCE TO RELATED APPLICATIONS

This application is a continuation of U.S. patent application Ser. No. 17/644,029, filed on Dec. 13, 2021, which is a continuation of U.S. patent application Ser. No. 16/684,859, filed on Nov. 15, 2019, which is a continuation of U.S. patent application Ser. No. 15/692,142, filed on Aug. 31, 2017, now U.S. Pat. No. 10,514,258, issued Dec. 24, 2019, which claims priority to U.S. Provisional Patent Application No. 62/385,911, filed on Sep. 9, 2016, and U.S. Provisional Patent Application No. 62/489,926, filed on Apr. 25, 2017, and relates to U.S. Pat all of which are hereby incorporated herein by reference in their entirety.

BACKGROUND

Smart phones and other mobile devices use a variety of sensors for detecting motion and for generating estimated positions of the mobile device. Such sensors include pressure sensors, accelerometers, gyroscopes, and magnetometers. Such sensors are typically low cost and are unstable because the sensors are subject to drift over time, which results in erroneous measurements of pressure or movement that are not within a tolerated threshold value from the true pressure or movement. Drift is a phenomenon whereby the unstable sensor's measurements of circumstances deviate from the true values of those circumstances over time—e.g., the value at zero motion gradually drifts away from zero even when the sensor is not moving. The drift may be monotonic, or it may gradually change direction and return toward zero accumulated drift. Because drift cannot be predictably modeled, it is difficult to determine a correction model in advance.

Depending upon the use of an unstable sensor, drift can have significant effects. For example, if an accelerometer indicates even a slight acceleration when no movement is occurring, an application for tracking a mobile device's movement could assume the mobile device is actually moving away from the spot where the measurement started. Similarly, if measurements by a pressure sensor begin to drift away from true pressure, estimating a mobile device's altitude using an inaccurately measured pressure value will result in a significantly erroneous estimated altitude that cannot be used for emergency response or other applications. Even when unstable sensors are calibrated at the time of manufacture or at the time of installation, such sensors are still prone to drift in the field when used over time. Thus, there is a need for calibrating unstable sensors.

DETAILED DESCRIPTION

Figure 1:
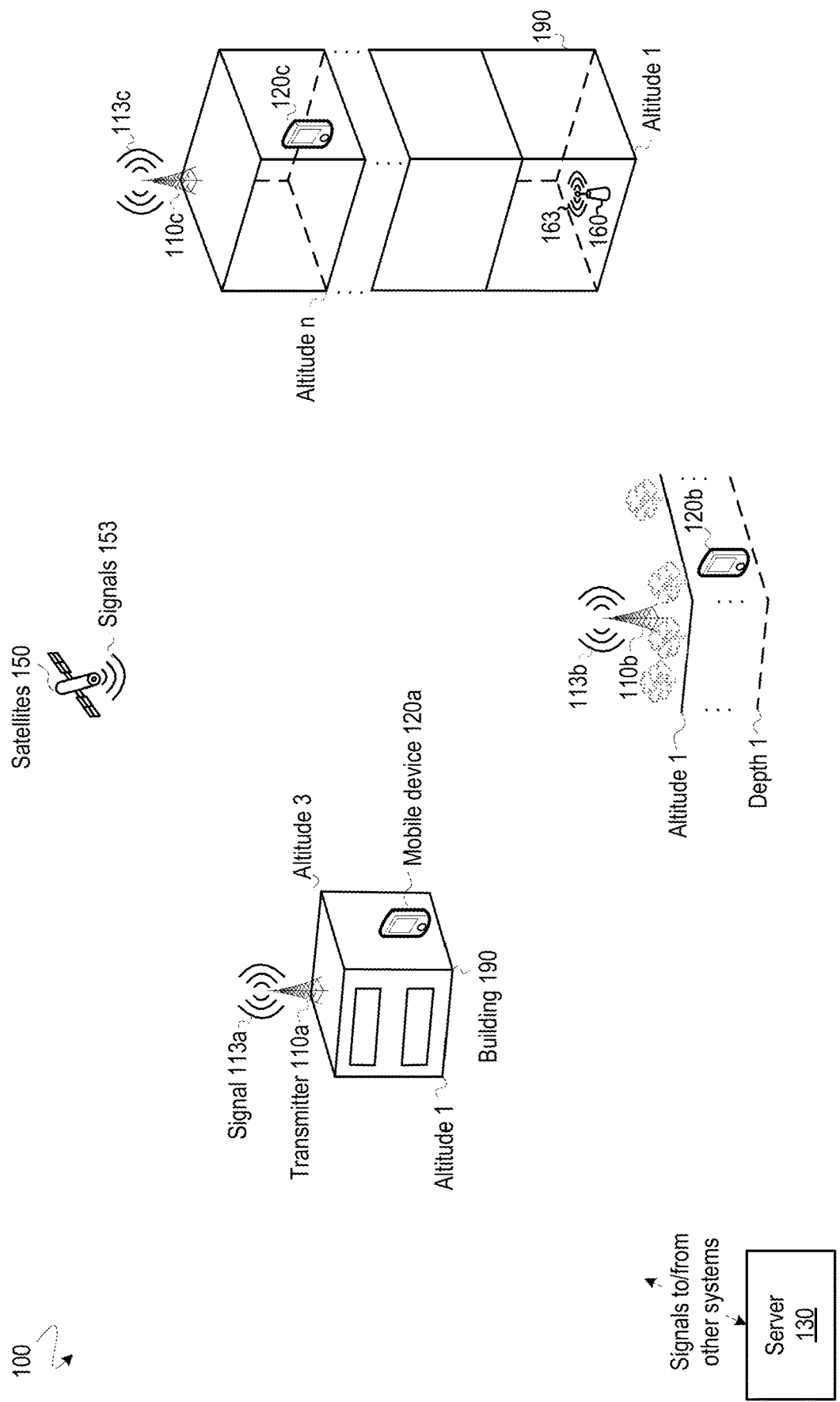
FIG. 1 depicts an operational environment for calibrating unstable sensors.

Systems and methods for calibrating unstable sensors are described below. Attention is initially drawn to an operational environment 100 for calibrating unstable sensors illustrated in FIG. 1. The operational environment 100 contains a network of terrestrial transmitters 110, any number of mobile devices 120, and a server 130. The transmitters 110 and the mobile devices 120 may be located at different altitudes or depths that are inside or outside various natural or manmade structures (e.g., buildings 190). Signals 113, 153 and 163 are respectively exchanged between the mobile devices 120 and the transmitters 110, satellites 150, and/or other nodes 160 using known wireless or wired transmission technologies. The transmitters 110 may transmit the signals 113 using one or more common multiplexing parameters—e.g., time slot, pseudorandom sequence, or frequency offset. The server 130 and the mobile devices 120 may exchange information with each other.

Figure 2A:
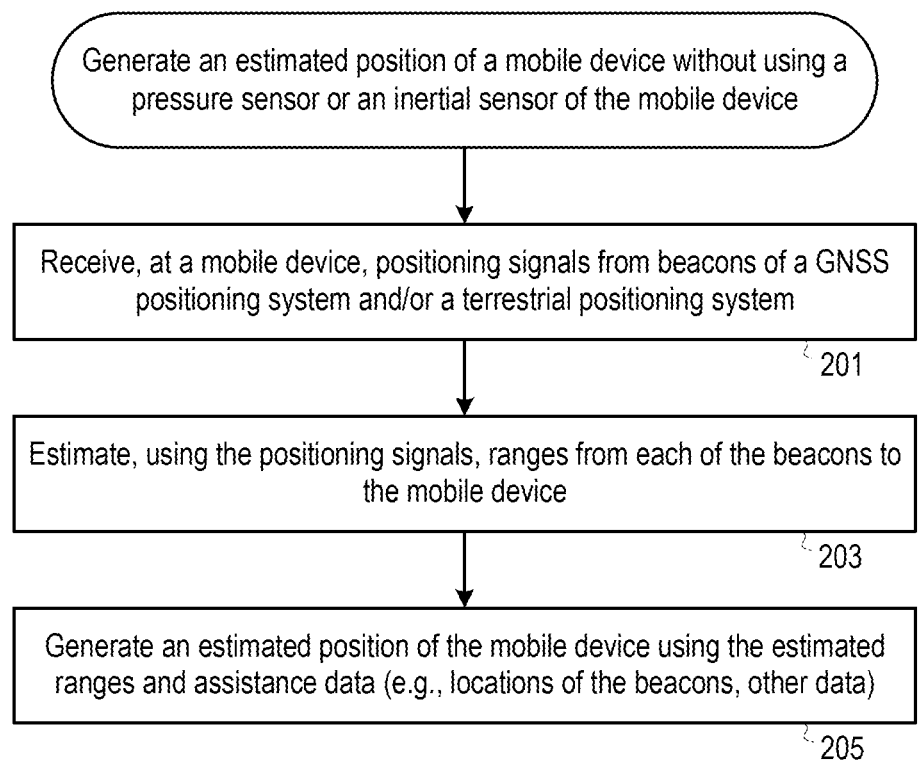
FIG. 2A illustrates a process for generating an estimated position of a mobile device without using a pressure or inertial sensor of a mobile device.
Figure 2B:
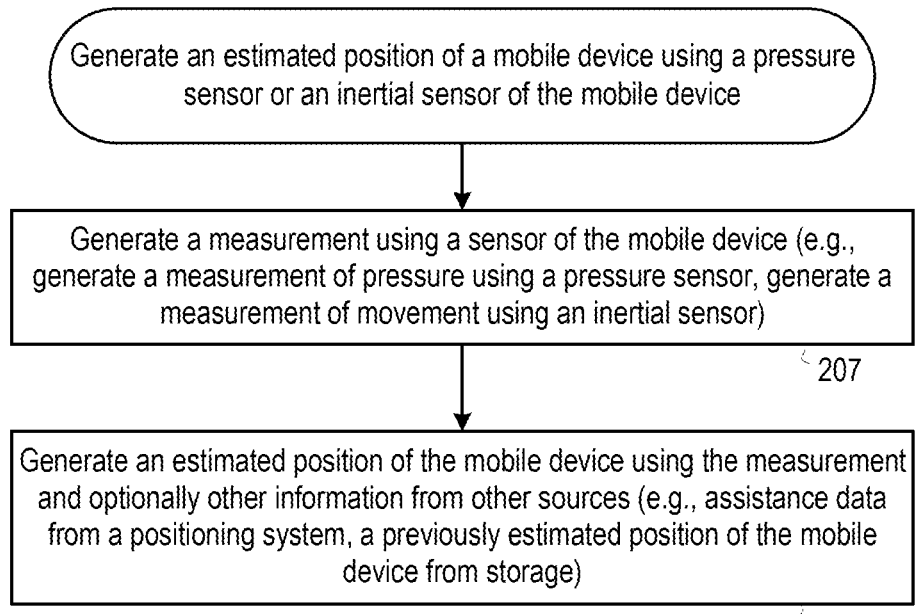
FIG. 2B illustrates a process for generating an estimated position of a mobile device using a pressure or inertial sensor of a mobile device.

Two processes for generating an estimated position of a mobile device (e.g., any of the mobile devices 120) are illustrated in FIG. 2A and FIG. 2B. A process for generating an estimated position of the mobile device without using a measurement from a pressure sensor or an inertial sensor of the mobile device is provided in FIG. 2A. A process for generating an estimated position of the mobile device using a measurement from the pressure sensor or the inertial sensor of the mobile device is provided in FIG. 2B. The estimated positions may be represented in terms of: latitude, longitude, and/or altitude; x, y, and/or z coordinates; angular coordinates; or other representations known in the art.

As shown in FIG. 2A, positioning signals are received at mobile device at step 201, as is known in the art. Positioning signals are also commonly referred to as ranging signals. In one embodiment, the positioning signals are received by an antenna of the mobile device, as is known in the art. The positioning signals may include the signals 153 from a GNSS positioning system that includes the satellites 150, and/or the signals 113 from a terrestrial positioning system that includes the transmitters 110.

Ranges between each of the beacons and the mobile device are estimated using the received positioning signals at step 203. In one embodiment, the ranges are estimated by a processor or other suitable machine as is known in the art. Each range between a beacon and the mobile device may be estimated as the distance traveled by the positioning signal transmitted from that beacon before being received by the mobile device. If position information like the transmission time and reception time of that positioning signal are known, then the difference between those times multiplied by speed of light would provide an estimate of the distance traveled by that positioning signal from that beacon to the mobile device.

At step 205, an estimated position of the mobile device is generated using the estimated ranges and assistance data (e.g., locations of the beacons). In one embodiment, the estimated position is generated by a processor or other suitable machine as is known in the art. One well-known approach for generating the estimated position of the mobile device using different estimated ranges corresponding to different positioning signals from different beacons, and also using assistance data like the locations of those beacons, is known as trilateration. For reference, particular methods for generating the estimated position of the mobile device using positioning signals is described in U.S. Pat. No. 8,130,141, issued Mar. 6, 2012.

Unfortunately, the distance traveled by a positioning signal from a beacon to the mobile device does not always occur along a "line-of-sight" path—i.e., the shortest distance between the beacon and the mobile device. Instead, intervening blockages from objects (e.g., buildings, walls, doors) between the beacon and the mobile device cause the positioning signal to travel along multiple paths between successive intervening blockages before reaching the mobile device. The sum of these multiple paths is typically much longer than the line-of-sight path. Estimating the position of a mobile device using the sum of the multiple paths as the estimated range between a beacon and a mobile device will result in an estimated position that has error. Using an estimated position with such an error may be unacceptable. Thus, other approaches may be used, including a process illustrated in FIG. 2B for generating an estimated position of the mobile device using a measurement from a pressure sensor or an inertial sensor of a mobile device.

As provided in FIG. 2B, a measurement is generated by a sensor of the mobile device at step 207. In one embodiment, a measurement of atmospheric pressure at the mobile device is generated using a pressure sensor, as is known in the art. In another embodiment, a measurement of movement of the mobile device is generated using an inertial sensor, as is known in the art. At step 209, an estimated position of the mobile device is generated using the measurement. Other information may also be used to generate the estimated position.

In one implementation of step 209, the estimated position (e.g., an estimated altitude) is generated using a measurement of pressure by a pressure sensor of the mobile device and assistance data from reference sensors that measure pressures and temperatures at different locations. One example of estimating a mobile device's altitude using measurements of pressure is an altimeter/barometric-based approach described in U.S. Patent Application Publication No. US 2012/0182180, published Jul. 19, 2012. For example, a reference pressure ($P_{reference}$), an reference temperature (T), and a pressure measured by the mobile device ($P_{mobile\ device}$) may be used to estimate the altitude of the mobile device ($Altitude_{estimated}$) as follows:

$$Altitude_{estimated} = \frac{RT}{gM} \ln\left(\frac{P_{reference}}{P_{mobile\ device}}\right),$$

where g corresponds to the acceleration due to gravity, R is the universal gas constant, and M is the molar mass of dry air. The reference pressure ($P_{reference}$) may be a measurement of pressure from a reference pressure sensor, or may be an estimated pressure for a reference altitude that is based on the measurement of pressure from the reference pressure sensor.

In another implementation of step 209, the estimated position (e.g., in one, two or three dimensions) is generated using measured movement of the mobile device from a previously estimated position of the mobile device. One example of estimating a mobile device's position using measured movement includes adjusting a previously estimated position of the mobile device retrieved from storage by a distance that is converted from a velocity that was measured by an inertial sensor of the mobile device, as is known in the art.

Unfortunately, estimated positions that are generated using measured pressure or measured movement of the mobile device can be inaccurate when the measured pressure or measured movement are subject to unacceptable error caused by drift of a sensor that generated the measurement. The drift may be monotonic, or it may gradually change direction and return toward zero accumulated drift. The time scale over which the sensor drifts into an unstable state that produces an unacceptable error can be anything from several minutes, to several days, to several weeks, or longer. The time scale will determine how frequently the sensor must be calibrated. In one embodiment, unacceptable error is error that exceeds a threshold amount of error set to a value that depends on circumstances (e.g., 12 Pa or 20 Pa for pressure sensors).

Since error may be introduced into an estimated position of the mobile device when a measurement from an unstable sensor is used to estimate the position, it is desirable to estimate the error in the measurement, and use that estimated error to calibrate future measurements by the unstable sensor. If an estimated position of the mobile device can be determined without using erroneous measurements from the unstable sensors, then errors due to drift of the unstable sensor can be measured and logged over time. In one embodiment, errors due to drift of the unstable sensor can be measured and logged over time by comparing two estimates of a mobile device's position, using the difference between the two estimates to estimate the error, and then using the error to generate a calibration value for the sensor. By way of example, the two estimates of the mobile device's position preferably include a first estimated position determined without using erroneous measurements from the unstable sensors, and a second estimated position determined using erroneous measurements from the unstable sensors.

In some cases, only one error is used as a calibration value without the need to log and combine sensor errors over time. However, even though estimation of sensor drift is probabilistic and provides useful measurements of the sensor error most of the time, any individual sensor measurement can have a significant amount of measurement noise. Fortunately, once a threshold number N of measurements have been collected (where N may vary depending on the circumstances), outliers can be discarded and the general trend of the measurements can be established. This trend represents the sensor error over time. Thus, by observing the change in logged sensor errors over time, sensor error due to drift can be identified and corrected by determining sensor calibration values or by adjusting previous calibration values (e.g., a previous factory calibration value), and so on.

There are two general approaches for measuring sensor error. The first approach includes: (a) determining when the mobile device is at a known position; (b) computing the difference between the known position and an estimated position that was determined using a measurement of an unstable sensor; (c) using the computed difference to determine the error in the measurement from the unstable sensor; and (d) using the error to calibrate the measurement and future measurements from the unstable sensor. The first approach provides an absolute measurement of the sensor error. However, opportunities where the mobile device is at a known precise position may be limited. Thus, a second approach may be needed. The second approach is a relative approach. That is, if it can be established that the mobile device has returned to a position where the mobile device has resided in the past, then the difference between the estimated position determined in the past and the current estimated position of the mobile device can be used to determine the measurement error due to drift of the unstable sensor over the time between the two measurements.

Detail about calibrating an unstable sensor of a mobile device is provided below with reference to FIG. 3, which illustrates a process for calibrating an unstable sensor of a mobile device. Opportunities for ongoing sensor calibration can occur periodically, a-periodically, as directed by a user of the mobile device, at the occurrence of an event, or at a time that leverages other processes or applications that are active on the mobile device. It is noted that each estimated position described herein may be represented in terms of: latitude, longitude, and/or altitude; x, y, and/or z coordinates; angular coordinates; or other representations known in the art.

Figure 3:
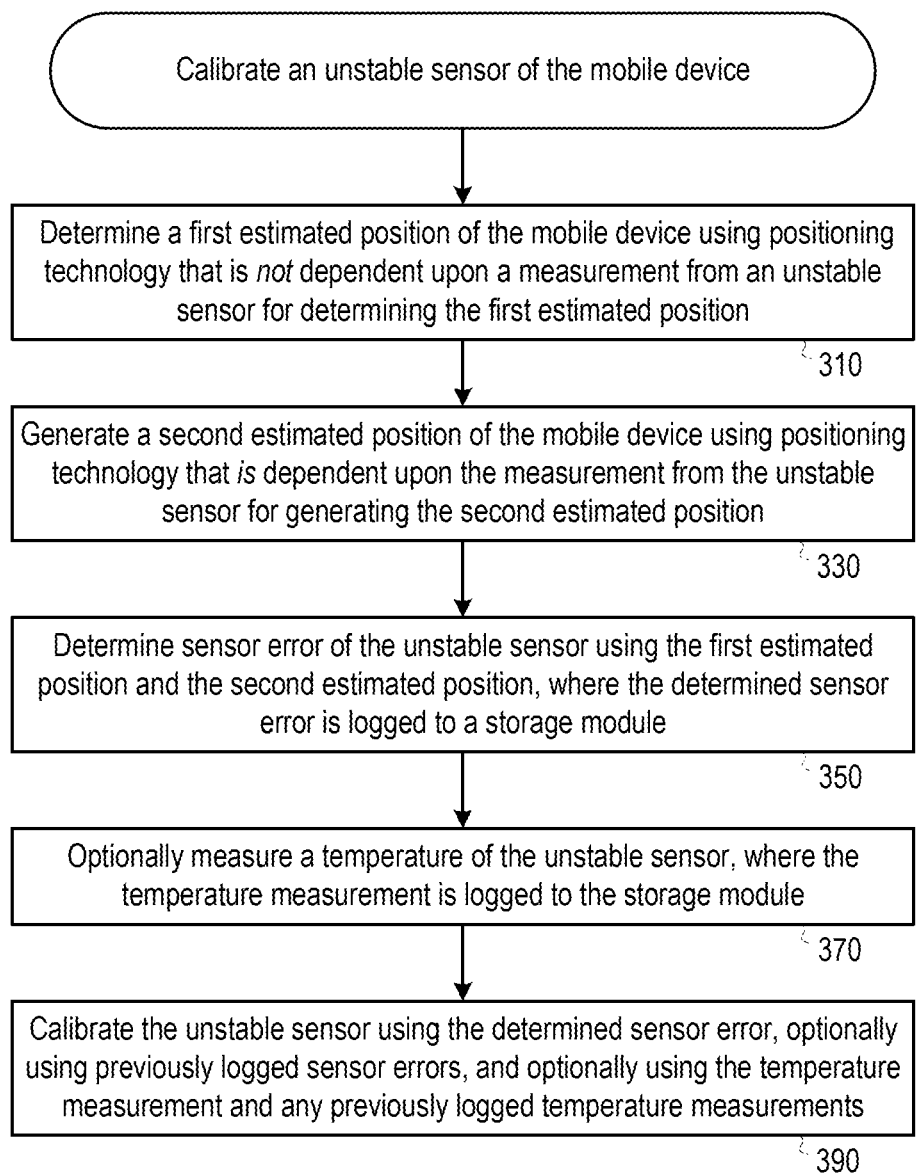
FIG. 3 illustrates a process for calibrating an unstable sensor of a mobile device.

As shown in FIG. 3, a first estimated position of the mobile device is determined using positioning technology that is not dependent upon a measurement from an unstable sensor at step 310. In one implementation, the first estimated position is determined without using a measurement of pressure from a pressure sensor of the mobile device. In another implementation, the first estimated position is determined without using a measurement of movement from an inertial sensor of the mobile device. Examples of approaches for determining a first estimated position that is not dependent upon a measurement from an unstable sensor may include:

(a) determining the first estimated position using positioning signals received from satellites, transmitters or other beacons (e.g., using trilateration to generate the first estimated position in terms of one, two or three dimensions);

(b) using information that specifies a characteristic of the mobile device's position to determine that the first estimated position includes position parameter(s) of a known position or previously estimated position associated with that information—for example:

(i) receiving estimated latitude and longitude, looking up an outdoor ground-level altitude stored in association with the estimated latitude and longitude, and using the ground-level altitude as the first estimated position;

(ii) receiving information specifying movement of the mobile device in excess of a predefined non-vertical ambulatory velocity, looking up a road-level altitude stored in association with a region within which the mobile device is moving, and using the road-level altitude as the first estimated position;

(iii) receiving user input specifying a predefined location at which the mobile device is located (e.g., a home, a workplace location, a business or other location, or a floor of a building), looking up latitude, longitude and/or altitude stored in association with that predefined location, and using the latitude, longitude and/or altitude as the first estimated position;

(iv) receiving input specifying an event (e.g., the mobile device is charging, the capacity of the battery of the mobile device is changing at a particular rate, or the mobile device has stopped moving), identifying a condition (e.g., the event is occurring during a predefined time of day, after a predefined movement of the mobile device, or when particular latitude and longitude are estimated using positioning signals), looking up a predefined location associated with the event and the condition, and using latitude, longitude and/or altitude stored in association with the predefined location as the first estimated position;

(v) receiving captured input (e.g., an image captured by front and/or rear cameras of the mobile device, or audio captured by a microphone of the mobile device), looking up a predefined location associated with the captured input, and using latitude, longitude and/or altitude stored in association with the predefined location as the first estimated position;

(vi) receiving a signal from a beacon of a local area network, looking up latitude, longitude and/or altitude stored in association with the beacon, and using the latitude, longitude and/or altitude as the first estimated position; and/or (vii) measuring a signal strength of a signal received from a beacon, looking up latitude, longitude and/or altitude stored in association with a location at which the measured signal strength can be received, and using the latitude, longitude and/or altitude as the first estimated position.

When predefined locations are used for the first estimated position, the predefined locations can be identified from local or external storage. In some embodiments, the predefined locations were previously estimated using positioning technology that was dependent upon a previous measurement from the unstable sensor when the unstable sensor was calibrated—i.e., when any error in the previous measurement was below a tolerated amount of error.

At step 330, a second estimated position of the mobile device is determined using positioning technology that is dependent upon the measurement from the unstable sensor.

In one implementation, known techniques are used to generate the second estimated position using a measurement of pressure from the pressure sensor of the mobile device. In another implementation, known techniques are used to generate the second estimated position using a measurement of movement from the inertial sensor of the mobile device.

At step 350, an error in measurement of the unstable sensor is determined using the first estimated position and the second estimated position. This error in measurement is referred to herein as a "sensor error". The determined sensor error is logged to a storage module (e.g., a memory of the mobile device, or a database of a server in communication with the mobile device). In one implementation, the sensor error may be determined by computing a difference between the second estimated position and the first estimated position, and then translating the computed difference to an error/calibration adjustment relative to the type of sensor.

In one implementation of step 350, when an altimeter/barometric based approach is used to determine the second estimated position using a measurement of pressure from the mobile device's unstable pressure sensor, a difference in altitude between the first estimated position and the second estimated position can be translated to a difference in pressure between the measurement of pressure, where the difference in pressure is used as a calibration value that adjusts future measurements from the pressure sensor. In one embodiment, the translation from an altitude difference to a pressure difference can be accomplished by applying a scaling factor of N Pascals per meter to the altitude difference, where N=12, 20 or another value. Thus, an altitude difference between the first estimated position ($h_{FEP}$) and the second estimate position ($h_{SEP}$) results in an estimated pressure difference of $\Delta P=(h_{SEP}-h_{FEP})/N$. After the estimated pressure difference ($\Delta P$) is computed, pressure measurements can be calibrated to $P_{calibrated}$ by subtracting the estimated pressure difference ($\Delta P$) from a measurement of pressure (P) measured by the pressure sensor. By way of example, the calibrated pressure measurement may take the form of: $P_{calibrated}=P-\Delta P$.

In another implementation of step 350, when the second estimated position is determined using an inertial sensor that provides a measurement indicating movement by the mobile device from a previous position of the mobile device, and when the first estimated position indicates that the mobile device is at a known location at which the mobile device is not moving (e.g., the battery of the mobile device is charging), the measurement by the inertial sensor is used to compute the sensor error. For example, if an accelerometer generates a measurement of $a=9.9$ m/s$^2$, and a measurement indicative of no movement is 9.8 m/s$^2$ (due to gravity), then a difference $\Delta a=a-9.8=0.1$ m/s$^2$ can be applied to future measurements by the accelerometer to result in a calibrated measurement $a_{calibrated}=a_{measurement}-\Delta a$. By way of another example, when a gyroscope provides measurements indicating rotation, and when the first estimated position indicates that the mobile device is at a known location at which the mobile device is not moving, the gyroscope can be calibrated by adjusting its measurements until the gyroscope measures no rotational movement.

At optional step 370, a temperature of the unstable sensor is measured, where the temperature measurement is logged to a storage module. A pressure sensor typically measures both barometric pressure and a local temperature. The measured local temperature can be used as the temperature measurement. Alternatively, a separate environmental sensor co-located with the pressure sensor at the mobile device may be used to generate the measurement of temperature.

At step 390, the measurement and/or future measurements of the unstable sensor are calibrated using a calibration value that is determined using the sensor error (e.g., where the calibration value is equal to the sensor error). In some embodiments, the measurement and/or future measurements of the unstable sensor are calibrated using previously logged sensor errors. Optionally, in certain embodiments like those described later with reference to FIG. 16 and FIG. 17, the measurement and/or future measurements of the unstable sensor are calibrated using the temperature measurement and previously logged temperature measurements.

Figure 4:
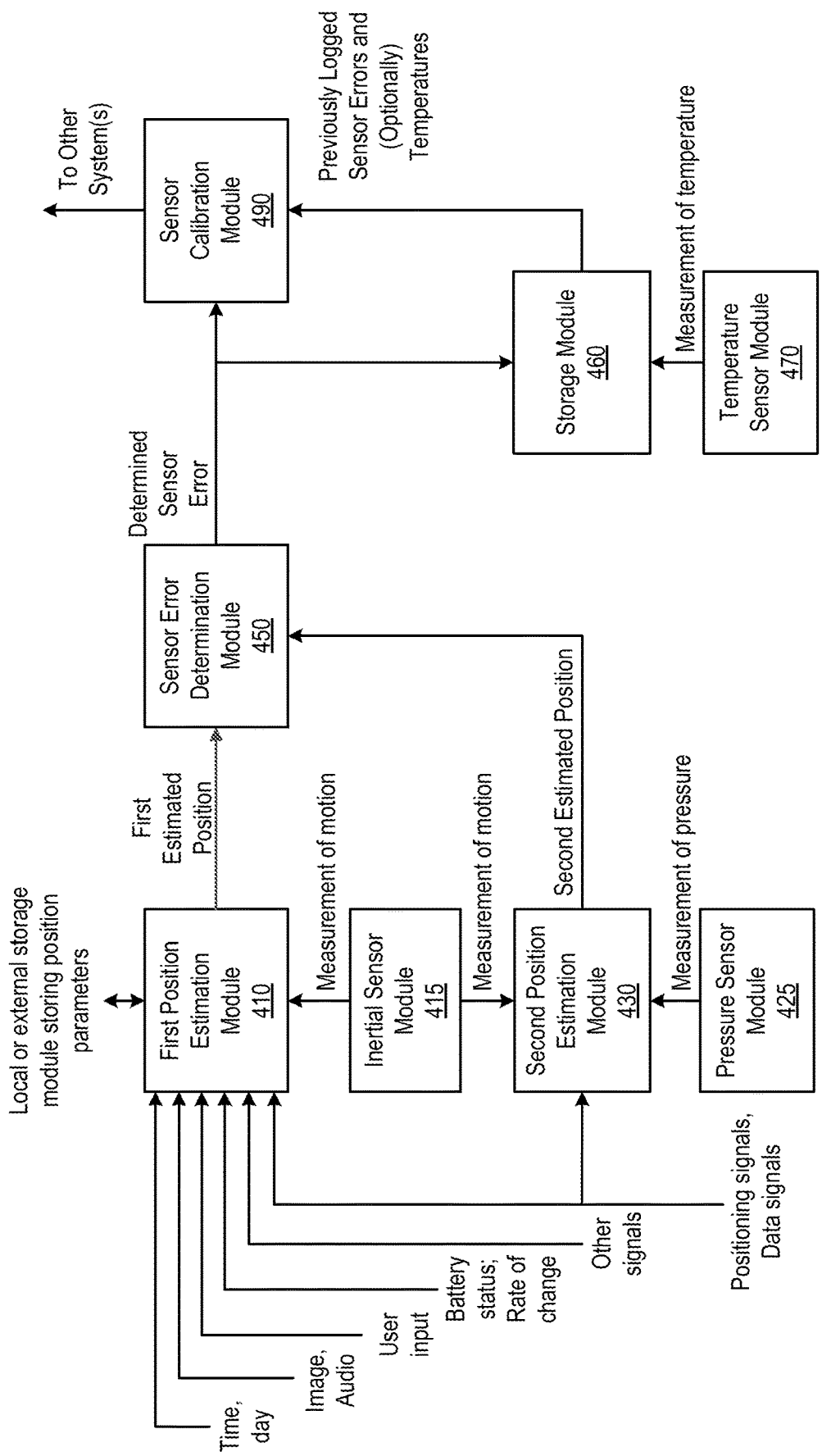
FIG. 4 depicts a system for calibrating an unstable sensor of a mobile device.

One embodiment of a system for calibrating an unstable sensor of a mobile device is depicted in FIG. 4. The system may be a mobile device 120 that includes modules that are each operable to carry out different steps of FIG. 3, including: a first position estimation module 410 operable to perform step 310; an inertial sensor module 415; a pressure sensor module 425; a second position estimation module 430 operable to perform step 330; a sensor error determination module 450 operable to perform step 350; a storage module 460; a temperature sensor module 470 operable to perform step 370; and a sensor calibration module 490 operable to perform step 390.

The second position estimation module 430 is shown to receive different things depending on the use of the mobile device 120. For example, the second position estimation module 430 may receive positioning signals and data signals from beacon(s) of a positioning system, and use those signals to estimate latitude and longitude as required. The inertial sensor module 415 and the pressure sensor module 425 are coupled to the second position estimation module 430. When used, the inertial sensor module 415 sends a measurement of movement to the second position estimation module 430, and the pressure sensor module 425 sends a measurement of pressure to the second position estimation module 430.

The first position estimation module 410 is shown to receive different things depending on the use of the mobile device 120. For example, the first position estimation module 410 may receive any of:
  (a) positioning signals from beacon(s) of a positioning system;
  (b) data signals from beacon(s) of a positioning system, a server connected to the mobile device, or another source (e.g., data signals carrying assistance information like locations of the beacons, reference pressures based on measurements from reference pressure sensors co-located with the beacon, reference temperature measurements from temperature sensors that are co-located with the reference pressure sensor or that are located at another location);
  (c) other signals (e.g., a signal from a beacon of a local area network, such as a Bluetooth beacon or a Wi-Fi beacon);
  (d) user input (e.g., from an application that retrieves user input from a touch screen of the mobile device);
  (e) event input (e.g., detected charging status of the mobile device's battery, detected rate at which the capacity of the mobile device's battery is changing, sensed movement or lack of movement from the inertial sensor 415);
  (f) condition input (e.g., a time of day and/or day of week received from another component of the mobile device or a cellular network, an earlier movement sensed from the inertial sensor 415, an estimated latitude and longitude of the mobile device, a stored pattern of movement);

(g) captured input (e.g., an image from a camera of the mobile device, audio data from a microphone of the mobile device, sensed motion from the inertial sensor module 415, or other input from another sensor of the mobile device);

(h) position parameters stored in the storage module 460 or elsewhere (e.g., altitudes stored in association with predefined latitudes and longitudes; e.g., latitudes, longitudes and/or altitudes stored in association with predefined outdoor locations, predefined indoor locations, predefined locations of beacons, predefined signal strengths of signals from beacons, predefined user input, predefined event input, predefined condition input, and/or predefined captured input); and/or (i) other things (not shown, but described herein or understood in the art).

Depending on particular embodiments, when performing step 310 of FIG. 3, the first position estimation module 410 may receive particular information, and then use the particular information to determine the first estimated position during step 310.

In one embodiment, when positioning signals and data signals are received, those signals are used to estimate any of the mobile device's latitude, longitude or altitude, which may be used as the first estimated position.

In another embodiment, the first position estimation module 410 uses estimated latitude and longitude to query for position parameters from a storage module (e.g., the storage module 460 or an external database), which returns one or more position parameters (e.g., an altitude) associated with the latitude and longitude, and those one or more position parameters are used as the first estimated position.

In yet another embodiment, the first position estimation module 410 uses other information (e.g., time, day, captured audio, captured image(s), a battery charging status, a rate of change in battery capacity, user input, an indication the mobile device has stopped moving, a pattern of movement by the mobile device like a series of estimated positions, estimated latitude and longitude, an identifier of a beacon from a beacon signal, and/or a signal strength measured by the mobile device) to query for position parameters from the storage module, which returns one or more position parameters (e.g., latitude, longitude and/or altitude) associated with the other information, and those one or more position parameters are used as the first estimated position.

In yet another embodiment, the first position estimation module 410 uses certain information (e.g., a measured non-vertical velocity of the mobile device) to resolve uncertainty as to a general location of the mobile device (e.g., a non-vertical velocity above a threshold amount of velocity indicates the mobile device is outdoors in an area identified by other information), and then to query for position parameters from the storage module based on the general location of the mobile device in the identified area. By way of example, a non-vertical velocity of the mobile device is estimated, a determination is made as to whether the estimated non-vertical velocity exceeds a threshold amount of velocity, and the mobile device is determined to be outside if the estimated non-vertical velocity is determined to exceed the threshold amount of velocity. The estimated velocity is non-vertical so as to avoid mistaking a vertical velocity estimated while in an elevator as indicative of outdoor movement.

As shown in FIG. 4, both of the first position estimation module 410 and the second position estimation module 430 are coupled to the sensor error determination module 450. The first position estimation module 410 sends the first estimated position to the sensor error determination module 450, and the second position estimation module 430 sends the second estimated position to the sensor error determination module 450. The sensor error determination module 450 is coupled to the sensor calibration module 490 and to the storage module 460. The sensor error determination module 450 sends determined sensor error to the sensor calibration module 490 and to the storage module 460.

When used, the temperature sensor module 470 is coupled to the storage module 460, and sends measurements of temperature to the storage module 460.

The storage module 460 is coupled to the sensor calibration module 490, and sends previously logged sensor errors and optionally sends previously stored measurements of temperature to the sensor calibration module 490 for use in determining calibration values to apply to measurements from an unstable sensor like the pressure sensor module 425.

By way of example, the pressure sensor module 425 may include a pressure sensor, and the inertial sensor module 415 may include an accelerometer, a gyroscope, a magnetometer, and/or another inertial sensor. The temperature sensor module 470 may include any number of temperature sensors, one or more of which may be included within corresponding unstable sensors (e.g., the pressure sensor module 425 and/or the inertial sensor module 415) for measuring the temperatures of those unstable sensors. In one embodiment, the first position estimation module 410, the second position estimation module 430, the sensor error determination module 450, and the sensor calibration module 490 are implemented by one or more processors or other suitable machines.

Determining a First Estimated Position of the Mobile Device Using Positioning Technology That is Not Dependent Upon a Measurement from the Unstable Sensor (Step 310)

Figure 5:
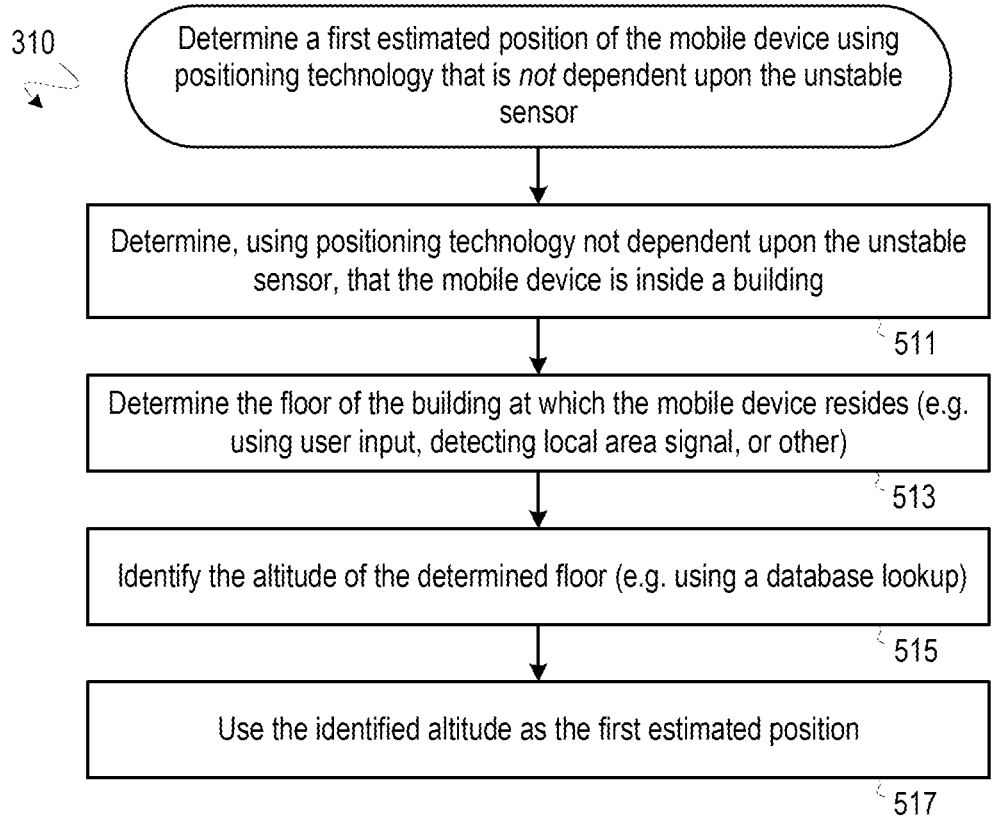
FIG. 5 illustrates a process for determining a first estimated position of a mobile device using positioning technology that is not dependent upon an unstable sensor.

One implementation of step 310 for determining a first estimated position of the mobile device using positioning technology that is not dependent upon a measurement from an unstable sensor includes sub-steps provided in FIG. 5.

As shown at step 511, positioning technology that is not dependent upon a measurement from the unstable sensor is used to determine that the mobile device is inside a building.

By way of example, the mobile device may be determined to be inside a building when the mobile device receives a signal from a particular beacon located in the building (i.e., when the mobile device is within range of that beacon), or when the mobile device enters a geo-fenced area inside the building.

In another embodiment, the mobile device may be determined to be inside a building when an estimated altitude of the mobile device (e.g., computed using positioning signals from beacons of a satellite system or a network of terrestrial transmitters) is higher than a threshold amount of distance above a ground level (e.g., higher than the height of a ground-level floor of the building).

Alternatively, the mobile device may be determined to be inside a building when the mobile device receives user input (e.g., a button press) from a user specifying that the mobile device is inside a building, which could be obtained from an application running on the mobile device that prompts the user to indicate the user's location as inside, outside, at a particular location, or other input.

In another embodiment, the mobile device may be determined to be inside a building when the mobile device receives positioning signals from beacons (e.g., from GNSS satellites or terrestrial transmitters), evaluates the received signals (e.g., for measured signal strength, signal directionality, signal multipath), and determines that:

(a) a measured signal strength of a signal from a beacon is within a threshold amount of strength from a stored signal strength of a different signal from that beacon that was previously measured from within the building;

(b) a measured signal strength of a signal from a beacon is within a threshold amount of strength from a predicted signal strength of a hypothetical signal from the beacon that penetrates the building;

(c) signal(s) from a first set of origins are received (e.g., from a first range of azimuthal or elevation angles), but signal(s) from a second set of origins are not received (e.g., from a second range of azimuthal or elevation angles);

(d) an estimated range of a signal from a beacon is within a threshold amount of distance from a stored estimated range of a different signal from the beacon that was previously measured from within the building; and/or (e) an estimated range of a signal from a beacon is within a threshold amount of distance from a predicted range of a hypothetical signal from the beacon that penetrates the building.

In an alternative embodiment of step 511, despite possible error in a measurement of pressure by an unstable pressure sensor, the measurement of pressure may be used to determine that the mobile device is inside the building after the measurement is used to estimate an altitude that is higher than a threshold amount of distance above a ground level. Even though the potentially inaccurate measurement may not be helpful in resolving floor-level accuracy, the measurement can still be used to determine that the mobile device is on an unknown floor of the building.

Other approaches for determining that the mobile device is inside a building are described in co-owned U.S. Pub. No. 20160003949, published Jan. 7, 2016, entitled SYSTEMS AND METHODS FOR ESTIMATING WHETHER A MOBILE DEVICE IS INSIDE OR OUTSIDE A BUILDING.

At step 513, the floor of the building at which the mobile device resides is determined. Various implementations of step 513 may include: using user input that designates a floor; looking up a floor that is associated with a beacon identifier delivered in a signal received from the beacon; receiving a floor number as data in a received signal from a beacon; looking up a floor that is associated with one or more signal strengths measured by the mobile device; detecting an event and a condition, and looking up a floor that is associated with the event and condition; estimating an amount of vertical movement by the mobile device from a previously determined floor, adjusting the previously determined floor by the estimated vertical movement, and looking up a floor that is associated with the result of adjusting the previously determined floor by the estimated vertical movement; or other approaches described herein.

At step 515, the altitude of the determined floor is identified (e.g., from a database of floor altitudes using a database lookup, obtained from a signal received by the mobile device from a beacon, or other approach). The identified altitude of the identified floor may be optionally adjusted by a factor to account for the height at which the mobile device is assumed to be above the identified altitude (e.g., 1-2 meters above the ground-level altitude). Of course, recorded altitudes of floors can already reflect the 1-2 meter adjustment from a floor-level altitude.

At step 517, the identified altitude of the identified floor, or the identified altitude adjusted by the factor, is then used as the estimated altitude of the first estimated position.

Determining a First Estimated Position of the Mobile Device Using Positioning Technology that is not Dependent Upon a Measurement from the Unstable Sensor (Step 310)

Figure 6:
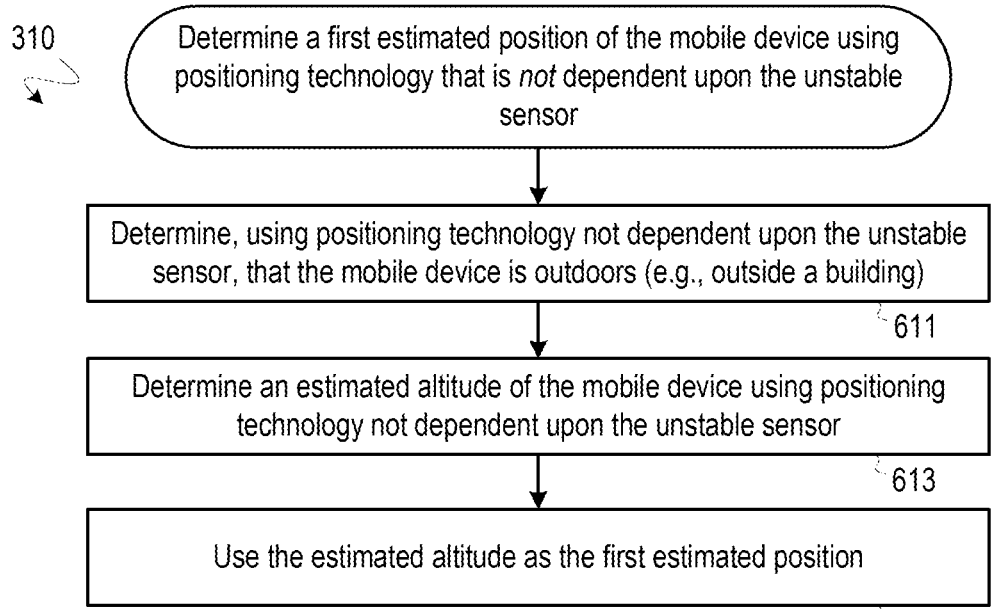
FIG. 6 illustrates another process for determining a first estimated position of a mobile device using positioning technology that is not dependent upon an unstable sensor.

Another implementation of step 310 for determining a first estimated position of the mobile device using positioning technology that is not dependent upon a measurement from an unstable sensor includes sub-steps provided in FIG. 6.

As shown at step 611, positioning technology that is not dependent upon a measurement from the unstable sensor is used to determine that the mobile device is outdoors (i.e., not inside a building). Implementations of step 611 are discussed later with reference to FIG. 7 through FIG. 9. In some cases, location information obtained by friend finder applications, camera applications, and navigation applications that regularly obtain the location information from the mobile device can be used to determine the mobile device is outdoors or inside a building (e.g., each time new information is available from these applications, a map and elevation database can be accessed to determine if the mobile device is outdoors or inside a building). This approach saves battery power of the mobile device because it does not require determining position information solely for the purpose of sensor calibration.

At step 613, an estimated altitude of the mobile device is determined using positioning technology that is not dependent upon the unstable sensor. Implementations of step 611 are discussed later with reference to FIG. 10 through FIG. 11.

At step 615, the estimated altitude is used as the first estimated position.

Determining, Using Positioning Technology that is not Dependent Upon the Unstable Sensor, that the Mobile Device is Outdoors (Step 611)

Figure 7:
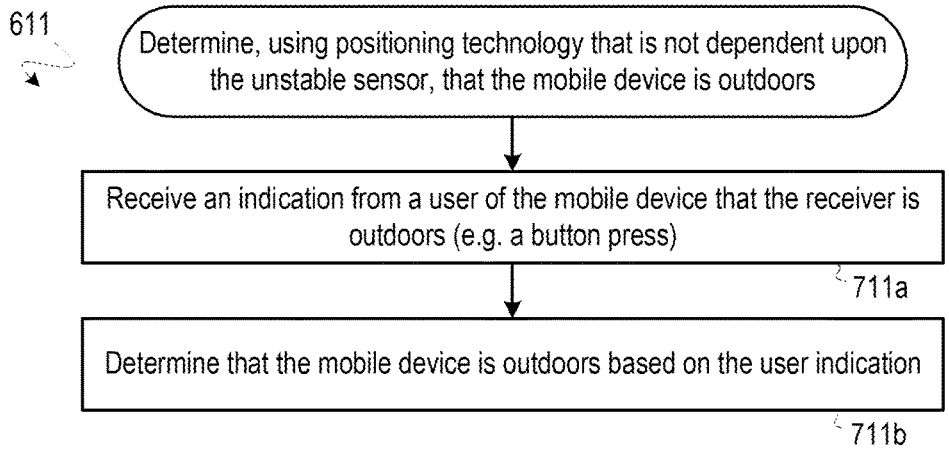
FIG. 7 illustrates a process for determining that a mobile device is outdoors using positioning technology that is not dependent upon an unstable sensor.

One implementation of step 611 for determining that the mobile device is outdoors using positioning technology that is not dependent upon a measurement from an unstable sensor includes sub-steps provided in FIG. 7. As shown, at step 711*a*, an indication (e.g., a button press) is received from a user of the mobile device specifying that the mobile device is outdoors, which could be obtained from an application running on the mobile device that prompts the user to indicate the user's location as inside a building, outdoors, at a particular location, or other input. Then, at step 711*b*, the mobile device is determined to be outdoors when the user indication indicates mobile device is outdoors.

Figure 8:
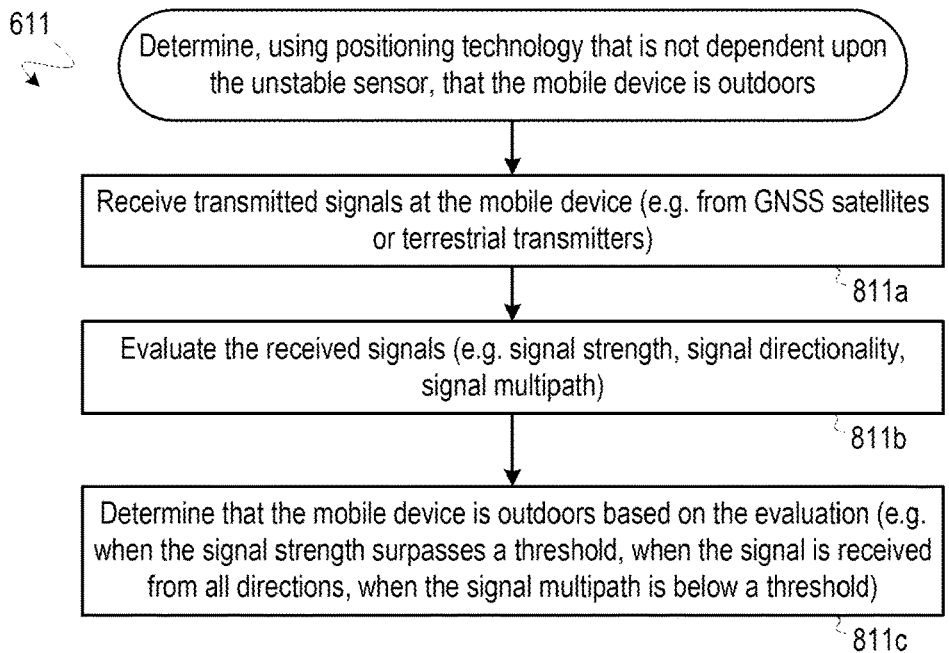
FIG. 8 illustrates another process for determining that a mobile device is outdoors using positioning technology that is not dependent upon an unstable sensor.

Another implementation of step 611 for determining that the mobile device is outdoors using positioning technology that is not dependent upon a measurement from an unstable sensor includes sub-steps provided in FIG. 8. As shown at step 811*a*, positioning signals are received at the mobile device (e.g., from GNSS satellites or terrestrial transmitters). The received signals are evaluated (e.g., for measured signal strength, signal directionality, and/or signal multipath) at step 811*b*. Then, at step 811*c*, the mobile device is determined to be outdoors based on the evaluation of the received signals. Implementations of step 811*c* may include determining the mobile device is outdoors when: the measured signal strengths exceed a threshold amount of signal strength; the signals were received from multiple directions; the measured signal-to-noise ratios of received signals are above a threshold value; and/or the detected signal multipath is below a threshold value of multipath (e.g., as determined based on detecting multiple signal peaks from a correlation result, where multipath above the threshold value is detected when there are peaks that are earlier than the expected or main peak). Strong signals from multiple directions and/or low multipath strongly suggests the mobile device is outside in an open area and therefore probably at ground level.

Figure 9:
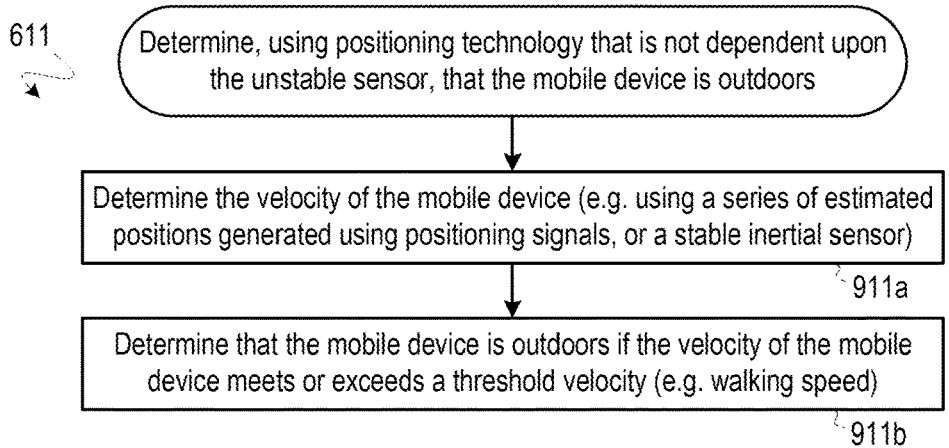
FIG. 9 illustrates yet another process for determining that a mobile device is outdoors using positioning technology that is not dependent upon an unstable sensor.

Yet another implementation of step 611 for determining that the mobile device is outdoors using positioning technology that is not dependent upon a measurement from the unstable sensor sub-steps provided in FIG. 9. As shown at step 911a, the velocity of the mobile device is determined (e.g., by using a series of estimated positions determined using positioning signals, or by using measurements of a calibrated inertial sensor). Then, at step 911b, the mobile device is determined to be outdoors when the velocity of the mobile device meets or exceeds a threshold velocity (e.g., pedestrian walking speed). If the mobile device is inside an automobile, the mobile device will most likely be 1-2 meter above a level of a road.

Other approaches for determining that the mobile device is outdoors are described in co-owned U.S. Pub. No. 20160003949, published Jan. 7, 2016, entitled SYSTEMS AND METHODS FOR ESTIMATING WHETHER A MOBILE DEVICE IS INSIDE OR OUTSIDE A BUILDING.

Determining an Estimated Altitude of the Mobile Device Using Positioning Technology that is not Dependent Upon a Measurement from the Unstable Sensor (Step 613)

Figure 10:
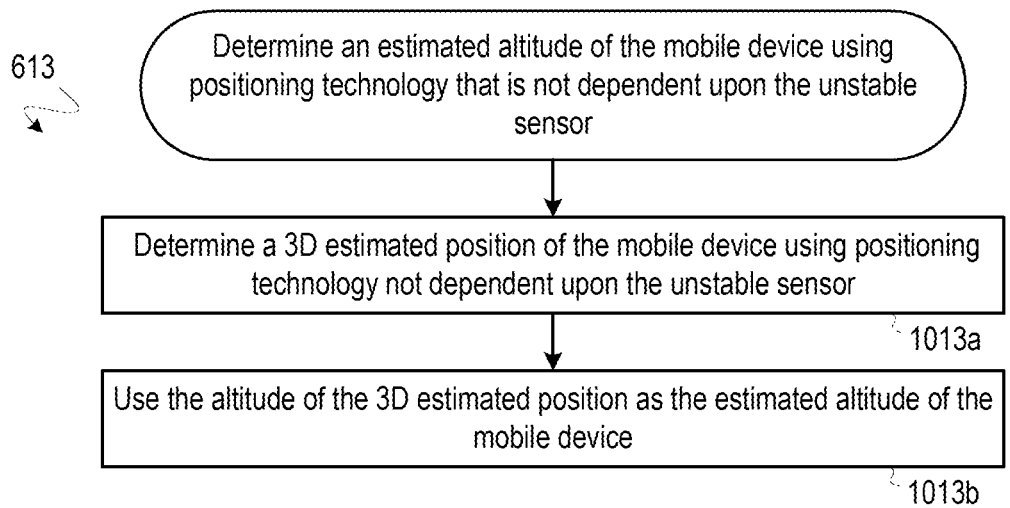
FIG. 10 illustrates a process for determining an estimated altitude of a mobile device using positioning technology that is not dependent upon an unstable sensor.

One implementation of step 613 for determining an estimated altitude of the mobile device using positioning technology that is not dependent upon a measurement from an unstable sensor includes sub-steps provided in FIG. 10. As shown at step 1013a, a three-dimensional estimated position of the mobile device is determined using positioning technology that is not dependent upon a measurement from the unstable sensor (e.g., using positioning signals from a GNSS or a terrestrial positioning system). Then, at step 1013b, the altitude of the three-dimensional estimated position is used as the estimated altitude of the mobile device.

Figure 11:
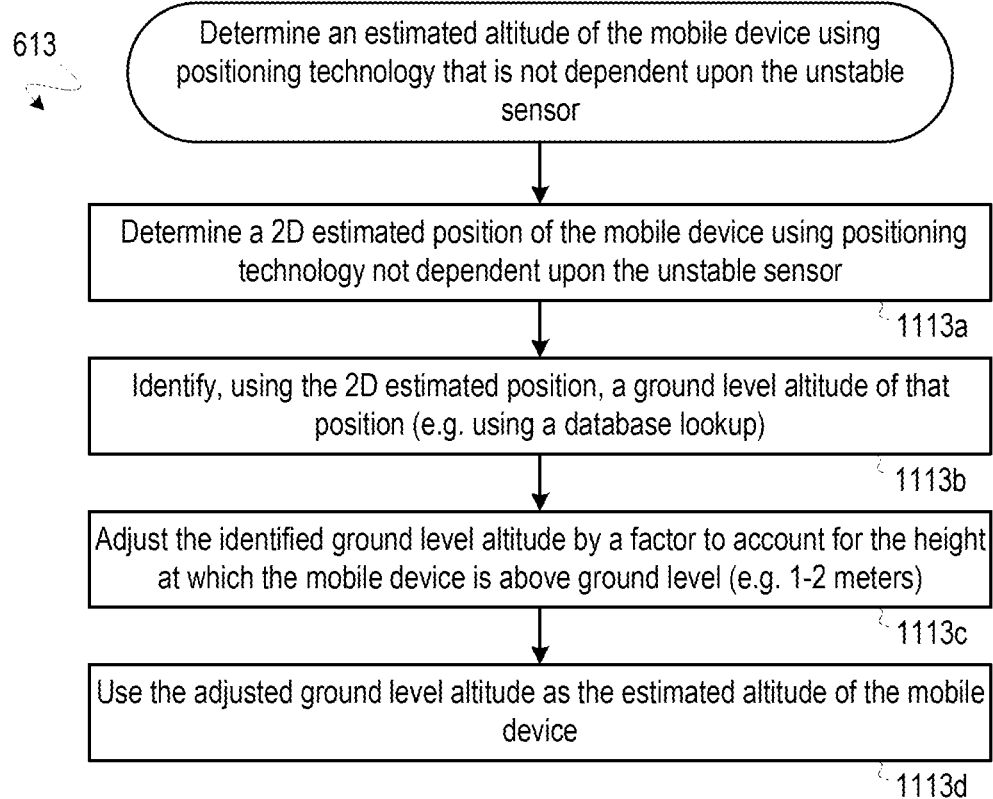
FIG. 11 illustrates another process for determining an estimated altitude of a mobile device using positioning technology that is not dependent upon an unstable sensor.

Another implementation of step 613 for determining an estimated altitude of the mobile device using positioning technology that is not dependent upon a measurement from an unstable sensor includes sub-steps provided in FIG. 11. As shown at step 1113a, a two-dimensional estimated position of the mobile device is determined using positioning technology that is not dependent upon a measurement from the unstable sensor. In one implementation of step 1113a, latitude and longitude are estimated using positioning signals from a GNSS or a terrestrial positioning system. Then, at step 1113b, an altitude is identified using the two-dimensional estimated position. In one implementation of step 1113b, a ground-level altitude that is associated with the two-dimensional estimated position is identified from storage, or a ground-level altitude that is associated with a geographical region that includes the two-dimensional estimated position is identified from storage. The identified altitude may be optionally adjusted at step 1113c by a factor to account for the height at which the mobile device is assumed to be above the identified altitude (e.g., 1-2 meters above the ground-level altitude). The identified altitude or the identified altitude adjusted by the factor is then used as the estimated altitude of the mobile device at step 1113d.

Determining a First Estimated Position of the Mobile Device Using Positioning Technology that is not Dependent Upon a Measurement from the Unstable Sensor (Step 310)

Figure 12:
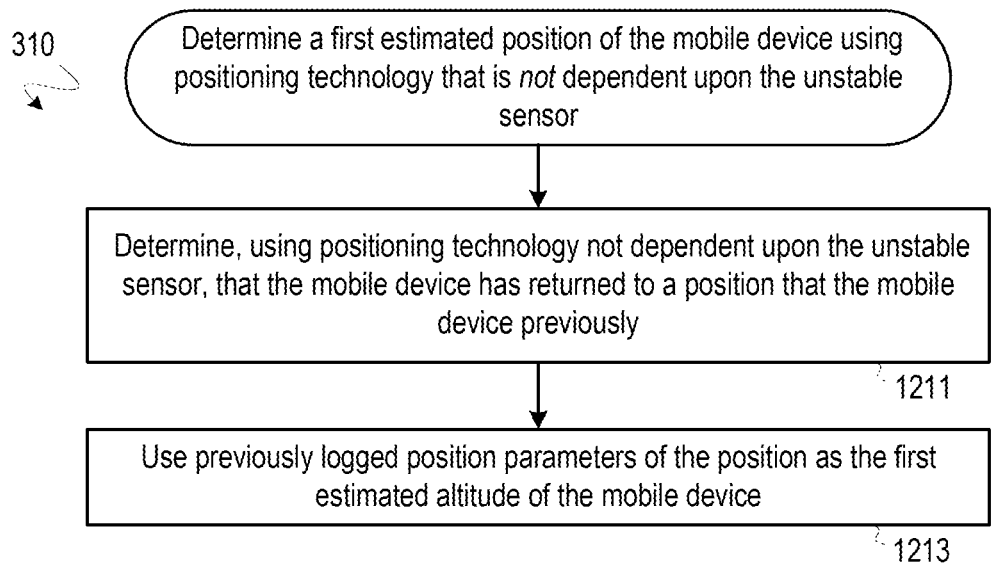
FIG. 12 illustrates a process for determining an estimated position of a mobile device using positioning technology that is not dependent upon an unstable sensor.

Another implementation of step 310 for determining a first estimated position of the mobile device using positioning technology that is not dependent upon a measurement from an unstable sensor includes sub-steps provided in FIG. 12.

Certain embodiments of FIG. 12 are useful for determining when the mobile device has returned to certain "known" locations at which the mobile device frequently resides (e.g., a table at a home or office, a coffee shop, a vehicle during a commute or other locations). The known locations can be initially identified by computing estimated positions using positioning signals from GNSS or terrestrial transmitters, by computing estimated altitudes using a calibrated pressure sensor, by detecting the location using signals of a local area network to which the mobile device is connected, or by other approaches.

When a mobile device is first activated for use, pressure and inertial sensors have been previously calibrated at the factory, and will therefore produce measurements that are within a tolerated threshold value from true circumstances over a period of time until the drift of the sensors produce measurements that are no longer within the tolerated threshold value from true circumstances. The typical time period can vary from several days to several weeks or longer. During this time period, estimated positions of the mobile device can be determined using measurements from the sensor. Position parameters (e.g., latitude, longitude and/or altitude) of the estimated positions can be stored in association with events, things, and/or conditions that exist or occur when the measurements are made.

By way of example, a "known" location (e.g., altitude) at which the mobile device frequently resides can be identified using pressure measurements from a calibrated pressure sensor to determine multiple estimates of the mobile device's altitude over a time period during which the sensor is calibrated. The mobile device also identifies particular times of day during which the measurements were made, and stores each of the particular times of day in association with the respective estimated position that was determined using the measurements made at that time of day. Each time of day may also be stored in association with the measurements made at that time of day. Estimated positions that are within a threshold distance (e.g., x units of measurement) from each other are identified—e.g., the threshold distance may be one meter of altitude. The times of day associated with the identified estimated positions are identified. A set of identified times of day that are within a threshold amount of time are identified—e.g., the threshold amount of time may be a range of time of size t (e.g., t=60 minutes), or may be times of day after a particular time of day T (e.g., T=7:30 PM). If the number of times of day in the identified set exceeds a threshold value N, then a known position is determined using the estimated positions associated with the identified times of day in the set. In one embodiment, the known position is the most common of, an average of, or a mean of the estimated positions associated with the identified times of day in the set. The known position is stored in association with a range of times containing the identified times of day in the set. In one embodiment, after a current time of day is determined to fall within the range of times containing the identified times of day in the set, the first estimated position of the mobile device is set to the known position associated with the range of times.

By way of another example, measurements from a calibrated sensor of the mobile device (e.g., pressure measurements from a calibrated pressure sensor) are made during a time period and used to determine multiple estimates of the mobile device's position (e.g., altitude). The estimated positions, measurements and times of day when the measurements were made are stored for later use. When the time period ends, the estimated positions and associated measurements are separated into different bins defined by times of day (e.g., a first bin for estimated positions determined using measurements made between time A and time B, a second bin for estimated positions determined using measurements made between time B and time C, and so on). Each bin is evaluated to determine different densities of the estimated positions that are within a threshold distance from each other (e.g., $n_1$ estimated positions within the threshold distance from each other, $n_2$ estimated positions within the threshold distance from each other, and so on). Densities with $n_\#$ estimated positions greater than a threshold number N of estimated positions are identified as known positions, and the measurements used to compute those estimated positions are identified as known measurements.

As shown at step 1211 of FIG. 12, positioning technology that is not dependent upon a measurement from the unstable sensor is used to determine that the mobile device has returned to a position that the mobile device previously occupied. During step 1211, previously logged data associated with the position that the mobile device previously occupied is identified for comparison to current data from the mobile device. Determining that the previously logged data and the current data matches based on the comparison may occur when the previously logged data and the current data are the same, are within a predefined threshold value of each other, or the current data is within a range of data specified by the previously logged data.

When the previously logged data and the current data are determined to match, position parameters that are associated with the previously logged data are determined to be the first estimated position at step 1213. The position parameters may include latitude, longitude and/or altitude of the position the mobile device previously occupied.

In various implementations of FIG. 12, the previously logged data and the current data may specify:
(a) an event, including (i) indications from the mobile device that the mobile device's battery was/is charging, (ii) indications from the mobile device that the mobile device's battery capacity is changing at a particular rate (e.g., a rate associated with a charging cable used at a known location, a rate above a positive threshold value so as to indicate increasing capacity indicative of a battery charging status, or a rate below the positive threshold value so as to indicate decreasing capacity indicative of no battery charging status), (iii) indications that the mobile device had/has not moved as determined based on measurements from an inertial sensor indicating no movement, (iv) indications that the mobile device had/has not moved as determined based on a series of estimated positions that are within a threshold distance from each other (e.g., <1 meter, or other distance), (v) indications that the mobile device is connected to a local area network like a W-Fi network, or (vi) indications that the mobile device had/has not moved as determined based on detecting a battery charging status;
(b) a thing, including (i) sensed images from a camera of the mobile device (e.g., an image may include one or more light levels, one or more colors, and/or one or more shapes, as is known in the art), (ii) sensed audio from a microphone of the mobile device, or (iii) identifiers of a beacon or network from which signals were/are received by the mobile device; and/or
(c) a condition, including (i) a time of day, (ii) a time or time period during which an event had/has occurred or a thing had/has been identified, (iii) one or more indications of movement by the mobile device or presence of the mobile device at other positions prior to when an event had/has occurred or when a thing had/has been identified, or (iv) estimated latitude and longitude.

Details for certain implementations of step 1211 are discussed below with reference to FIG. 13 and FIG. 14.

When determining measurement errors for pressure sensors, knowledge of the true altitude of the mobile device at a given time is not required. Instead, recognizing when the mobile device has returned to the same location it has previously occupied when making a measurement with a calibrated sensor can be used. If previous measurements by the pressure sensor were made when the pressure sensor was calibrated and therefore had error below a threshold value, differences between those previous measurements (e.g., an average or other combination of those previous measurements) and a current measurement is the sensor error accumulated from drift of the pressure sensor.

By way of example, pressure measurements from a calibrated pressure sensor are made during a time period before drift exceeds a threshold value. The measurements and times of day when the measurements were made are stored for later use. When the time period ends, the measurements are separated into different bins defined by times of day (e.g., a first bin for measurements made between time A and time B, a second bin for measurements made between time B and time C, and so on). Each bin is evaluated to determine different densities of measurements that are within a threshold value from each other (e.g., $n_1$ measurements within the threshold value, $n_2$ measurements within the threshold value, and so on). Densities with $n_\#$ measurements greater than a threshold number N of measurements are identified as known measurements made at the same location. When a current measurement is made during a time period that corresponds to the known measurements, the difference between the known measurements (e.g., an average or other combination of the known measurements) and a current measurement is the sensor error accumulated from drift of the pressure sensor. This difference can be used as a calibration value.

In alternative embodiments to those described in the preceding paragraphs of this section, the times of day are replaced by detected events, things or other conditions (e.g., detecting a rate of change in a battery's capacity that matches a known rate of change associated with a known location or known measurements).

Determining that the Mobile Device has Returned to a Position that the Mobile Device Previously Occupied (Step 1211)

Figure 13:
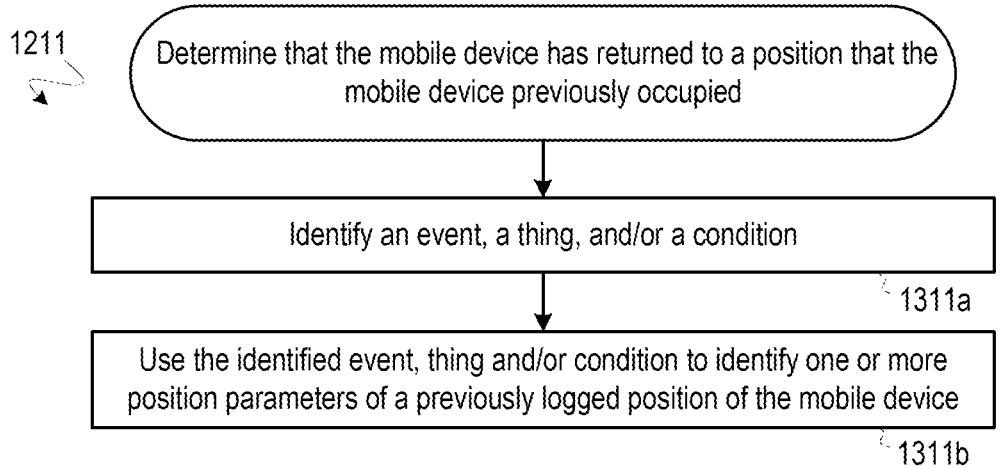
FIG. 13 illustrates a process for using positioning technology that is not dependent upon an unstable sensor to determine that a mobile device has returned to a position that the mobile device previously occupied.

One implementation of step 1211 for using positioning technology that is not dependent upon a measurement from the unstable sensor to determine that the mobile device has returned to a position that the mobile device previously occupied includes sub-steps provided in FIG. 13.

As shown at step 1311*a*, an event, a thing and/or a condition for a current position of the mobile device is received, detected or otherwise identified. Events, things and conditions may include the events, things and conditions described previously.

At step 1311*b*, the identified event, thing and/or condition is used to identify previously logged events, things and conditions that are associated with one or more position parameters of a previously logged ("stored") position of the mobile device, where those position parameters are returned from storage for use as the first estimated position.

In a first embodiment of step 1311b, an identified event, thing or condition may be used to query stored values of previously logged events, things or conditions. If, during the query, the identified event, thing or condition is determined to match a stored value of a previously logged event, thing or condition that is associated with one or more position parameters, then those position parameters are returned for use as the first estimated position. If, during the query, the identified event, thing or condition is determined to not match the stored value of a previously logged event, thing or condition, then position parameters are not returned for use as the first estimated position. Determining that an identified event, thing or condition and the previously logged event, thing or condition matches may occur when the identified event, thing or condition and the logged event, thing or condition are the same, or are within a threshold value from each other.

In one implementation of the first embodiment of step 1311b, the mobile device identifies a time period on a first day during which a measurement from the unstable sensor is measured for use in generating the second estimated position. By way of example, the time period may be selected from one or more predefined time periods, or may be identified during the occurrence of an event (e.g., when a battery status indicates the mobile device's battery is charging). The time period may be used to query a local memory or an external database for a stored position that is associated with the time period (e.g., associated with a stored indication of the time period). The stored position may include an estimate of a position the mobile device was at during the time period on a second day that preceded the first day. If needed, the mobile device receives the stored position from the storage module. Then, the mobile device determines that the first estimated position is the stored position. The time period may be identified as a time period during which one or more previously logged positions were determined while the mobile device was located at the same location (e.g., at home, at work or school, at another routinely visited location, or at a piece of furniture). For example the time period could be: (a) a time period (e.g., 12 a.m. to 3 a.m.) during which the mobile device does not move because the user of the mobile device is sleeping; (b) a time period (e.g., 10 a.m. to 11 a.m., 2 p.m. to 3 p.m.) during which the mobile device moves within a threshold range of distance (e.g., <1 meter) because the user of the mobile device is working at his or her desk and the mobile device is at most moved to different parts of the desk; (c) a time period (e.g., 6 a.m. to 7 a.m., 5 p.m. to 6 p.m.) during which the mobile device does not move because the user of the mobile device is performing a routine task (e.g., exercising, attending a meeting, eating a meal); or (d) another time period during which the mobile device has routinely been located at a particular location.

In another implementation of the first embodiment of step 1311b, the mobile device records its movement. By way of example, the mobile device may record measurement(s) of an inertial sensor, or may record a set of chronological estimated positions. A determination is made as to whether the recorded movement matches one or more stored values of previous movement by the mobile device. By way of example, recorded measurement(s) of the inertial sensor and previously recorded measurement(s) of the inertial sensor may be compared, and a determination is made that the measurements match when they are the same or within a predefined threshold value of each other. Alternatively, a recorded set of chronological estimated positions and a previously recorded set of chronological estimated positions may be compared, and a determination is made that they match when corresponding estimated positions of the two sets are the same or within a predefined threshold distance of each other. The mobile device identifies a previously logged position that is associated with the stored value(s) of previous movement by the mobile device. By way of example, the stored value(s) of previous movement by the mobile device are used to query a local memory or an external database for a stored position that is associated with the stored value(s) of previous movement by the mobile device. The stored position may include an estimate of a position the mobile device arrived at after the stored value(s) of movement were recorded (e.g., a position of the mobile device after it traveled from the user's work to the user's home, or vice versa). If needed, the mobile device receives the stored position from the storage module. Then, the mobile device determines that the first estimated position is the stored position.

In yet another implementation of the first embodiment of step 1311b, the mobile device determines that an event has occurred, such as when the mobile device connects to a local area network like a W-Fi network that it remains connected to when a measurement from the unstable sensor is measured for use in generating the second estimated position. An identifier of the local area network obtained by the mobile device may be used to query a local memory or an external database for a stored position that is associated with the local area network (e.g., associated with a stored indication of the identifier). The stored position includes an estimate of a position the mobile device was at when the mobile device was previously connected to the local area network, or it includes one or more position coordinates assigned to the local area network. If needed, the mobile device receives the stored position from the storage module. Then, the mobile device determines that the first estimated position is the stored position. The local area network may be a home network, a work or school network, or a network of another location at which the mobile device was previously located when an estimate of that mobile device's position was determined and later logged in the storage module.

In yet another implementation of the first embodiment of step 1311b, a camera of the mobile device captures a first image (e.g., by activating the camera in response to instructions from an application that is running on the mobile device). A second image that matches the first image is identified from a local memory or an external database, which may result from comparing the first image to the second image, and determining that the first image and the second image match using known techniques for matching images. The second image may be used to query a local memory or an external database for a stored position that is associated with the second image (e.g., associated with an indication of the second image). The stored position may include an estimate of a position the mobile device was at when the camera of the mobile device captured the second image. If needed, the mobile device receives the stored position from the storage module. Then, the mobile device determines that the first estimated position is the stored position.

In a second embodiment of step 1311b, an identified event or thing and an identified condition may be used to query stored values of previously logged events or things and previously logged conditions. If, during the query, the identified event or thing and the identified condition are determined to match stored values of a previously logged event or thing and an associated condition, then position parameter (s) that are associated with the previously logged event or thing and associated condition are returned for use as the first estimated position. If, during the query, the identified event or thing and the identified condition are determined to not match stored values of a logged event or thing and the associated condition, then position parameter(s) are not returned for use as the first estimated position. Determining that identified event or thing and associated condition and the previously logged event or thing and associated condition match may occur when the identified event or thing and the previously logged event or thing are the same or are within a threshold value from each other, and when the identified condition and the previously logged condition are the same or are within a threshold value from each other.

In one implementation of the second embodiment of step 1311b, the mobile device identifies an event or a thing, and computes an initial estimated position of the mobile device (e.g., using positioning technology that is not dependent upon the unstable sensor). The mobile device identifies a previously logged position that is within x units of measurements from the initial position (e.g., within <1 meter, <2 meters, or another value for x), or that is in an area that includes the initial estimated position (e.g., by looking up the previously logged position from a local memory or an external database). A previously logged event or thing that is stored in association with the previously logged position may be identified. The previously logged event or thing may be compared with the identified event or thing to determine if they match (e.g., are the same, or are within a threshold value from each other). If they match, then the mobile device determines that the first estimated position is the previously logged position.

In another implementation of the second embodiment of step 1311b, the mobile device determines that its battery is charging on a first day. After determining that its battery is charging, the mobile device identifies a time period during which the battery is charging. The time period may be used to query a local memory or an external database for a stored position that is associated with the time period (e.g., associated with a stored indication of the time period). The stored position may include an estimate of a position the mobile device was at when a battery of the mobile device was charging during the time period on a second day that preceded the first day. If needed, the mobile device receives the stored position from the storage module. Then, the mobile device determines that the first estimated position is the stored position.

In a third embodiment of step 1311b, an identified event and an identified thing may be used to query stored values of previously logged events and associated things. If, during the query, the identified event and thing are determined to match stored values of a previously logged event and thing, then position parameter(s) that are associated with the previously logged event and thing are returned for use as the first estimated position. If, during the query, the identified event and thing are determined to not match the stored values of the previously logged event and thing, then the position parameter(s) that are associated with the previously logged event and thing are not returned for use as the first estimated position. Determining that identified event and thing and the previously logged event and thing match may occur when the identified event and the previously logged event are the same or are within a predefined threshold value of each other, and when the identified thing and the previously logged thing are the same or are within a threshold value from each other.

In one implementation of the third embodiment of step 1311b, an event (e.g., a detected status indicating the battery of the mobile device is charging) and a thing (e.g., an external input captured by a camera of the mobile device, or an identifier of a beacon) are identified. The identified event is used to query storage for a matching stored value of that event (e.g., a previously detected status indicating the battery of the mobile device was charging). The matching stored value of the event is used to look up a stored value of the thing that is associated with the stored value of the event. The identified thing is compared to the stored value of the thing that was looked up, and position parameter(s) associated with the stored value of the event and/or the stored value of the thing are returned for use as the first estimated position when the identified thing and the stored value of the thing match. Of course, a condition could replace the thing or the event, a thing could replace the event, and/or an event could replace the thing in other implementations. Optionally, an estimated position of the mobile device may be determined using positioning technology that is not dependent upon a measurement from the unstable sensor, and that estimated position may replace the event or the thing.

Determining that the Mobile Device has Returned to a Position that the Mobile Device Previously Occupied (Step 1211)

Figure 14:
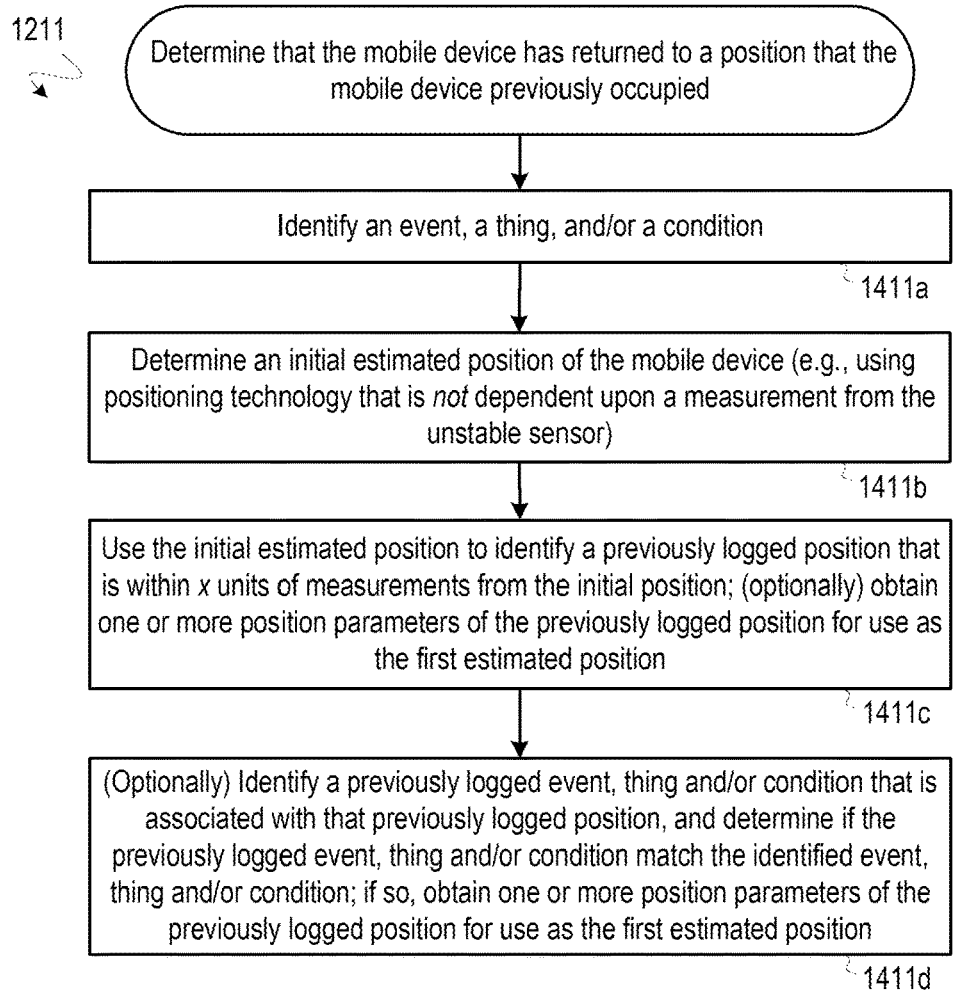
FIG. 14 illustrates another process for using positioning technology that is not dependent upon an unstable sensor to determine that a mobile device has returned to a position that the mobile device previously occupied.

Another implementation of step 1211 for determining that the mobile device has returned to a position that the mobile device previously occupied using positioning technology that is not dependent upon a measurement from an unstable sensor includes sub-steps provided in FIG. 14.

As shown at step 1411a, an event, a thing, and/or a condition are identified. Such an event, a thing, and/or a condition may be identified as they were identified in the embodiments related to FIG. 13.

At step 1411b, an initial estimated position of the mobile device is determined (e.g., using positioning technology that is not dependent upon a measurement from the unstable sensor). In some embodiments of FIG. 14, step 1411b is triggered only after particular events, things and/or conditions are identified. For example, the initial estimated position may be determined in response to detecting that a battery of the mobile device is charging, detecting that the capacity of a battery changing at a particular rate, detecting the mobile device has connected to a particular local area network, detecting the current time is within a predefined time period, and/or detecting some other event, thing, or condition. In other embodiments of FIG. 14, step 1411b may occur before any event, thing and/or condition is identified in step 1411a.

At step 1411c, the initial estimated position is used to identify a previously logged position that is within x units of measurements from the initial position (e.g., within 1 meter, 2 meters, or another value for x), or that is in an area that includes the initial estimated position. By way of example, the previously logged position may be identified by looking up the previously logged position from a local memory or an external database and confirming it is within x units of measurements from the initial position, or within an area that includes the initial estimated position.

At optional step 1411d, the previously logged may be used to identify a previously logged event, thing and/or condition that is associated with that previously logged position, and a determination is made as to whether the previously logged event, thing and/or condition match the identified event, thing, and/or condition. When the previously logged event, thing and/or condition matches the identified event, thing and/or condition, one or more position parameters of the previously logged position are obtained for use as the first estimated position. When the previously logged event, thing and/or condition does not match the identified event, thing and/or condition, a determination may be made that the mobile device has not returned to the previously logged position.

Calibrating the Unstable Sensor Using the Determined Sensor Error (Step 390)

Figure 15:
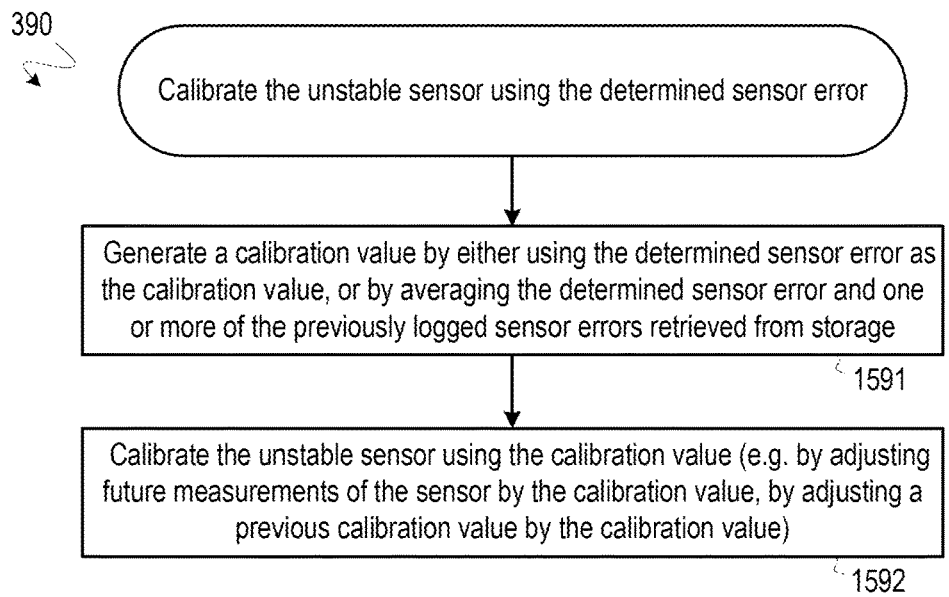
FIG. 15 illustrates a process for calibrating an unstable sensor using determined sensor error and optionally previously logged sensor errors.

An implementation of step 390 for calibrating the unstable sensor using the determined sensor error includes sub-steps provided in FIG. 15. As shown, a calibration value is determined at step 1591 by either using the determined sensor error as the calibration value, or by setting the calibration value to an average of the determined sensor error and one or more of the previously logged sensor errors. Then, the unstable sensor is calibrated at step 1592 using the calibration value (e.g., by adjusting future measurements of the sensor by the calibration value, or by adjusting a previous calibration value by the calibration value). In some embodiments, adjustment is by subtraction or addition dependent on whether measurements of circumstances before calibration are above or below true values of the circumstances.

A step of determining which sensor is the unstable sensor could also be performed before step 1591—e.g., by detecting measurement errors from the sensor, or by detecting when an estimated position computed using a measurement from the sensor has an error relative to the true position that exceeds a tolerated level of error (e.g., <1 m, <2 m, or another value). Detection of a measurement error for an inertial sensor may be accomplished by identifying a measurement from the inertial sensor that indicates movement of the mobile device when the mobile device is not actually moving. Detection of a measurement error for a pressure sensor (or detection of when an estimated position computed using a measurement from the pressure sensor has an error relative to the true position) may be accomplished by computing an estimated altitude using a measurement of pressure from the pressure sensor, and then determining that the estimated altitude is not equal to (or within a threshold value of) true altitude, where true altitude is determined as described elsewhere herein (e.g., is an altitude previously occupied by the mobile device).

In one implementation of step 1592 when the sensor is a pressure sensor, the determined calibration value is subtracted from future measurements of the sensor where the sensor measurements are found to be higher than true pressure, and the determined calibration value is added to future measurements of the sensor where the sensor measurements are found to be lower than true pressure. In another implementation of step 1592 when the sensor is a pressure sensor, the determined calibration value is subtracted from the previous calibration value where calibrated sensor measurements are found to be higher than true conditions, and the determined calibration value is added to the previous calibration value where calibrated sensor measurements are found to be lower than true conditions.

Figure 16:
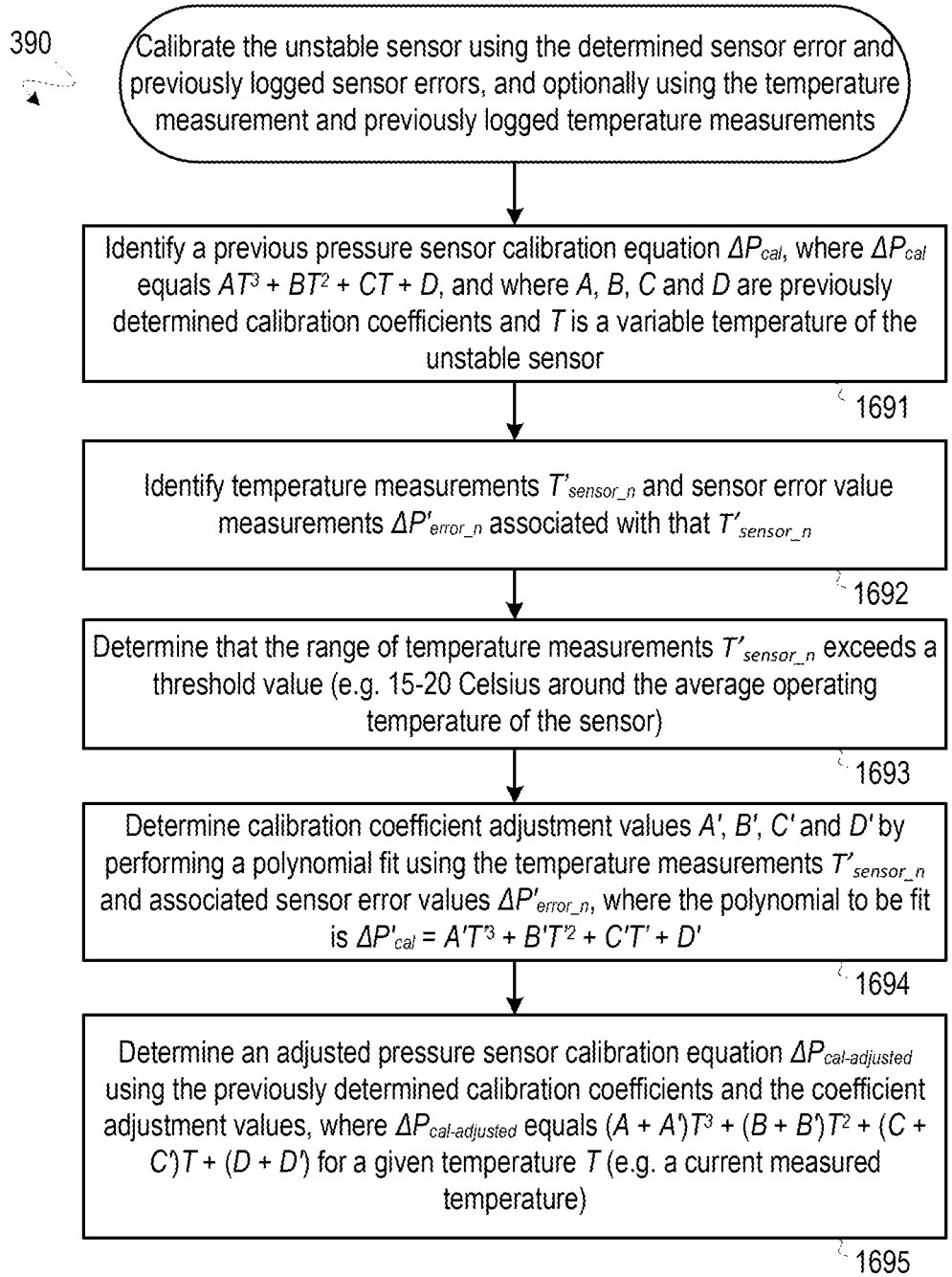
FIG. 16 illustrates another process for calibrating an unstable sensor using determined sensor error and previously logged sensor errors, and optionally using a temperature measurement and previously logged temperature measurements.

Another implementation of step 390 of FIG. 3 for calibrating the unstable sensor using the determined sensor error includes sub-steps provided in FIG. 16. As shown, a previous pressure sensor calibration equation $\Delta P$ is identified at step 1691—e.g., where $\Delta P_{cal}$ is an equation equal to $AT^3+BT^2+CT+D$, where A, B, C and D are calibration coefficients that were previously determined during a factory calibration of an unstable pressure sensor using a thermal chamber or another approach, and where T is a given temperature of the unstable pressure sensor. The equation of step 1691 is only one example of an equation. In other embodiments, other equations may be used. For example, alternative embodiments of $\Delta P_{cal}$ are described in U.S. Pub. No. 20150127287, published May 7, 2015, entitled DETERMINING CALIBRATED MEASUREMENTS OF PRESSURE FOR DIFFERENT SENSORS. Other equations for other embodiments are also possible.

Figure 17:
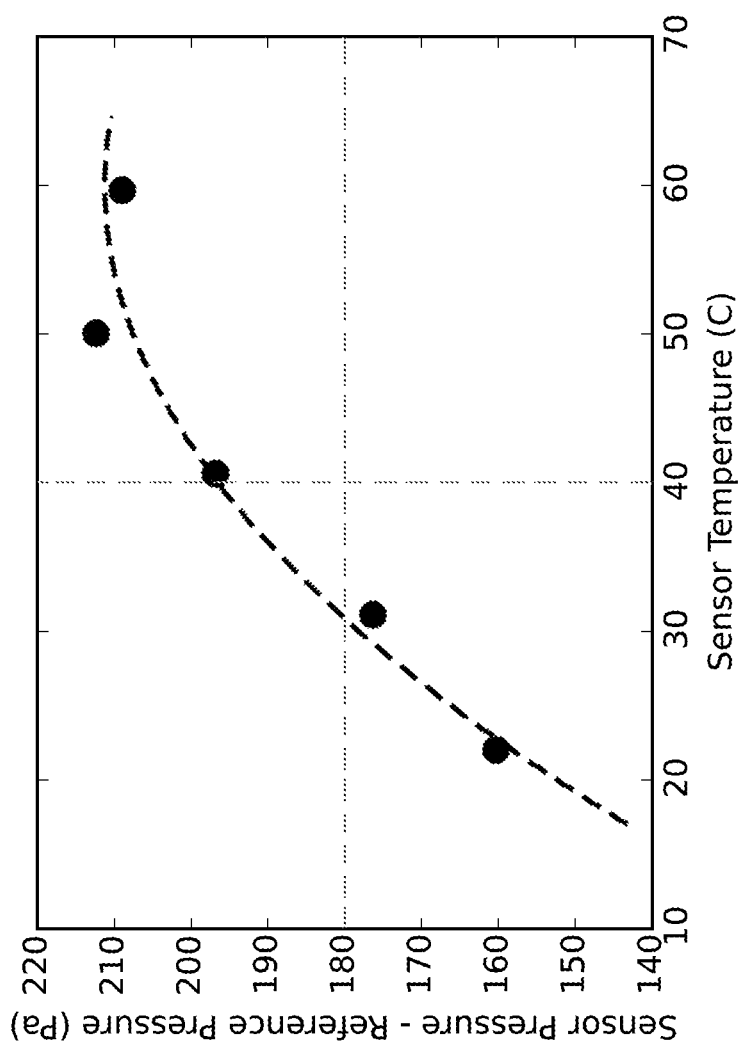
FIG. 17 depicts a polynomial fit of sensor errors as a function of sensor temperature.

In one embodiment for determining the equation of step 1691, different pressure errors were computed as $\Delta P_{error\_n}=P_{sensor\_n}-P_{reference\_n}$, where $P_{sensor,n}$ is a measurement of pressure by a pressure sensor of the mobile device at an altitude n and $P_{reference\_n}$ is an accurate estimate of true pressure at that particular altitude n. A temperature $T_{sensor,n}$ of the pressure sensor was also measured when $P_{sensor,n}$ was measured. The pressure sensor calibration equation $\Delta P_{cal}$ is determined using a polynomial fit of the individual sensor errors $\Delta P_{error\_n}$ as a function of the measured sensor temperature $T_{sensor,n}$. Fitting the polynomial curve to combinations of errors $\Delta P_{error\_n}$ and $T_{sensor,n}$ is an example of determining the coefficient values A, B, C and D. An example of a polynomial fit of individual sensor errors as a function of a corresponding measured sensor temperature is depicted in FIG. 17.

As step 1692 of FIG. 16, the receiver identifies temperature measurements $T'_{sensor,n}$ of the pressure sensor and corresponding sensor error value measurements $\Delta P'_{error\_n}=P'_{sensor\_n}-P'_{reference\_n}$, where $P'_{sensor,n}$ is a measurement of pressure by a pressure sensor of the mobile device at an altitude n and $P'_{reference\_n}$ is an accurate estimate of true pressure at that particular altitude n. Each of the temperature measurements $T'_{sensor,n}$ was measured when the pressure sensor made a corresponding measurement of pressure $P'_{sensor\_n}$ that was used to determine a corresponding sensor error value measurement $\Delta P'_{error\_n}$. In at least one embodiment, each of $T'_{sensor,n}$, $P'_{sensor\_n}$, and $P_{reference\_n}$ were measured or estimated after $\Delta P_{cal}$ was determined.

At optional step 1693, a determination is made as to whether the range of temperature measurements $T'_{sensor,n}$ have exceeded a threshold value (e.g., 15-20 Celsius around the average operating temperature of the unstable sensor), and if the threshold value is exceeded, a decision is made to determine calibration coefficient adjustment values.

At step 1694, calibration coefficient adjustment values A', B', C' and D' are determined by performing a polynomial fit using the temperature measurements $T'_{sensor,n}$ and associated sensor error values $\Delta P'_{error\_n}$, where the polynomial that is to be fit is $\Delta P'_{cal}=A'T'^3+B'T'^2+C'T'+D'$ for a given temperature T' of the pressure sensor. The polynomial fit of step 1694 is only one example of a polynomial fit. In other embodiments, other polynomial fits may be used.

At step 1695, an adjusted pressure sensor calibration equation $\Delta P_{cal\text{-}adjusted}$ is then determined using the previously determined calibration coefficients and the coefficient adjustment values, where $\Delta P_{cal\text{-}adjusted}=(A+A')T^3+(B+B')T^2+(C+C')T+(D+D')$ for a given temperature T of the pressure sensor (e.g., a new measured temperature of the unstable sensor). Depending on the circumstances, A', B', C' and D' can be positive or negative in value.

A polynomial fit of sensor errors as a function of sensor temperature is depicted in FIG. 17. Each of the sensor errors is based on a difference between a measurement of pressure at a particular altitude by the unstable sensor and a measurement or estimate of the true pressure for the particular altitude (e.g., as measured by a calibrated accurate sensor, or as estimated based on a measurement from a calibrated accurate sensor located at a different altitude). As shown, a polynomial curve (shown as a dashed line) is fit to points (shown as large black dots) defined by sensor error (in Pa) as a function of sensor temperature (in degrees C.). Fitting the polynomial curve is an example of determining the calibration coefficient values A, B, C and D, or the calibration coefficient adjustment values A', B', C' and D'.

In one embodiment, the calibration value is simply D, where any pressure error at any temperature is averaged to a fixed value. If, in other embodiments over a range of temperatures, a temperature measurement of the unstable sensor is collected each time a sensor error for the unstable sensor is determined, coefficient adjustment values may be determined, and the calibration value is not simply D, but instead $\Delta P_{cal}$ or $\Delta P_{cal\text{-}adjusted}$. Temperatures in the temperature range might include a cool temperature from the mobile device being left outside at a known location, a warm temperature from the mobile device being warmed at a known location due to a high processor rate that drives the internal temperature, and other temperatures.

OTHER ASPECTS

As used herein, altitude represents a height above a designated level sea level, ground level, or other level) Estimated positions disclosed herein may be one-dimensional (e.g., altitude), two-dimensional (e.g., latitude and longitude), or three-dimensional (e.g., latitude, longitude and altitude).

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a mobile device can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other); and/or interface module(s) for exchanging information with other systems via other links other than a radio link. Signals transmitted by a transmitter may carry different information that, once determined by a mobile device or a server, may identify the following: the transmitter; the transmitter's location (LLA); pressure, temperature, humidity, and/or other conditions at or near the transmitter. Each of these modules may be directly or indirectly coupled to each other.

A mobile device may be in the form of a mobile computing device (e.g., a mobile phone, tablet, laptop, digital camera, tracking tag, mobile device), and may include any of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from transmitters, and/or location or other information associated with each transmitter), for using the position information to compute an estimated position of the mobile device, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the mobile device (e.g., pressure, temperature, humidity, wind, other), which may be compared to the same environmental conditions at or near transmitters to determine the altitude of the mobile device; other sensor module(s) for measuring other conditions (e.g., acceleration, velocity, orientation, light, sound); interface module(s) for exchanging information with other systems via other links other than a radio link; and/or input/output module(s) for permitting a user to interact with the mobile device. Each of these modules may be directly or indirectly coupled to each other. Processing by the mobile device can also occur at a server.

The invention claimed is:

1. A method, comprising:
  determining a first estimated altitude of a mobile device without using any measurement from a pressure sensor of the mobile device;
  generating a second estimated altitude of the mobile device using a first measurement from the pressure sensor;
  estimating a pressure sensor error of the pressure sensor using the first estimated altitude and the second estimated altitude; and
  determining a calibration value for adjusting one or more second measurements from the pressure sensor using the pressure sensor error;
  wherein the first estimated altitude is determined by:
    estimating a non-vertical velocity of the mobile device;
    determining whether the estimated velocity exceeds a threshold amount of velocity;
    upon determining that the estimated velocity exceeds the threshold amount of velocity, determining that the mobile device is outdoors; and
    after determining that the mobile device is outdoors, determining a ground-level altitude, wherein the first estimated altitude is determined using the ground-level altitude or the ground-level altitude adjusted by a predefined value.

2. The method of claim 1, wherein the method further comprises:
  adjusting the one or more second measurements from the pressure sensor by the calibration value.

3. The method of claim 1, wherein determining the calibration value further comprises:
  retrieving one or more previously estimated pressure sensor errors of the pressure sensor;
  computing an average pressure sensor error by averaging the estimated pressure sensor error and the one or more previously estimated pressure sensor errors; and
  using the average pressure sensor error as the calibration value.

4. The method of claim 1, wherein determining the calibration value further comprises:
  identifying a pressure sensor calibration equation that includes calibration coefficient values;
  identifying temperature measurements of the pressure sensor and corresponding pressure sensor error measurements for the pressure sensor, wherein each temperature measurement of the identified temperature measurements was measured when the pressure sensor made a corresponding measurement of pressure that was used to determine a corresponding pressure sensor error measurement of the identified pressure sensor error measurements;
  determining calibration coefficient adjustment values by performing a polynomial fit using the identified temperature measurements and the corresponding pressure sensor error measurements;
  determining an adjusted pressure sensor calibration equation by using the calibration coefficient adjustment values to adjust the calibration coefficient values of the pressure sensor calibration equation; and
  determining the calibration value using the adjusted pressure sensor calibration equation.

5. The method of claim 1, wherein estimating the pressure sensor error further comprises:
  determining a difference in distance between the first estimated altitude and the second estimated altitude;
  determining an estimated difference in pressure between the first estimated altitude and the second estimated altitude by applying a scaling factor to the difference in distance; and
  setting the pressure sensor error to the estimated difference in pressure.

6. The method of claim 1, wherein determining the calibration value further comprises:
  setting the calibration value to the pressure sensor error or an average of the pressure sensor error and other previously stored pressure sensor errors.

7. The method of claim 1, wherein the pressure sensor produces an inaccurate measurement of pressure relative to true pressure.

8. A method, comprising:
  determining a first estimated altitude of a mobile device without using any measurement from a pressure sensor of the mobile device;
  generating a second estimated altitude of the mobile device using a first measurement from the pressure sensor;
  estimating a pressure sensor error of the pressure sensor using the first estimated altitude and the second estimated altitude; and
  determining a calibration value for adjusting one or more second measurements from the pressure sensor using the pressure sensor error;
  wherein the first estimated altitude is determined by:
    capturing a first image using a camera of the mobile device;
    identifying a second image that matches the first image;
    identifying a stored position that is associated with the second image, wherein the stored position includes an estimate of an altitude the mobile device was at when the camera of the mobile device captured the second image; and
    determining the first estimated altitude using the estimate of the altitude the mobile device was at when the camera of the mobile device captured the second image.

9. The method of claim 8, wherein the method further comprises:
  adjusting the one or more second measurements from the pressure sensor by the calibration value.

10. The method of claim 8, wherein determining the calibration value further comprises:
  retrieving one or more previously estimated pressure sensor errors of the pressure sensor;
  computing an average pressure sensor error by averaging the estimated pressure sensor error and the one or more previously estimated pressure sensor errors; and
  using the average pressure sensor error as the calibration value.

11. The method of claim 8, wherein determining the calibration value further comprises:
  identifying a pressure sensor calibration equation that includes calibration coefficient values;
  identifying temperature measurements of the pressure sensor and corresponding pressure sensor error measurements for the pressure sensor, wherein each temperature measurement of the identified temperature measurements was measured when the pressure sensor made a corresponding measurement of pressure that was used to determine a corresponding pressure sensor error measurement of the identified pressure sensor error measurements;

determining calibration coefficient adjustment values by performing a polynomial fit using the identified temperature measurements and the corresponding pressure sensor error measurements;

determining an adjusted pressure sensor calibration equation by using the calibration coefficient adjustment values to adjust the calibration coefficient values of the pressure sensor calibration equation; and determining the calibration value using the adjusted pressure sensor calibration equation.

12. The method of claim 8, wherein estimating the pressure sensor error further comprises:

determining a difference in distance between the first estimated altitude and the second estimated altitude;

determining an estimated difference in pressure between the first estimated altitude and the second estimated altitude by applying a scaling factor to the difference in distance; and setting the pressure sensor error to the estimated difference in pressure.

13. The method of claim 8, wherein determining the calibration value further comprises:

setting the calibration value to the pressure sensor error or an average of the pressure sensor error and other previously stored pressure sensor errors.

14. The method of claim 8, wherein the pressure sensor produces an inaccurate measurement of pressure relative to true pressure.

* * * * *